(12) United States Patent
Haut et al.

(10) Patent No.: US 8,827,313 B2
(45) Date of Patent: Sep. 9, 2014

(54) INTERMODAL TANK TRANSPORT SYSTEM, COMPONENTS, AND METHODS

(75) Inventors: Kenneth Haut, Aventura, FL (US); Rex Michau, West Sussex (GB)

(73) Assignee: International Transport Equipment Corporation, Aventura, FL (US)

( * ) Notice: Subject to any disclaimer, the term of this patent is extended or adjusted under 35 U.S.C. 154(b) by 1049 days.

(21) Appl. No.: 12/818,559

(22) Filed: Jun. 18, 2010

(65) Prior Publication Data

US 2010/0320727 A1 Dec. 23, 2010

Related U.S. Application Data

(60) Provisional application No. 61/269,083, filed on Jun. 18, 2009.

(51) Int. Cl.
*B60P 3/22* (2006.01)
*B62D 21/00* (2006.01)
*B65D 88/12* (2006.01)
*B62D 21/20* (2006.01)

(52) U.S. Cl.
CPC .............. *B62D 21/20* (2013.01); *B65D 88/128* (2013.01); *B65D 2590/0091* (2013.01)
USPC .......... 280/839; 220/789; 220/647; 220/23.6; 206/503; 206/509; 206/512

(58) Field of Classification Search
CPC .... B60P 3/2225; B60P 3/2215; B60P 3/2205; B60P 3/221; B60P 3/22; B62D 21/20; B65D 88/128; B65D 88/129
USPC ........... 280/839, 837, 785, 789, 790; 220/1.5, 220/23.6, 647, 562, 646, 648, 649; 206/503, 509, 512
See application file for complete search history.

(56) References Cited

U.S. PATENT DOCUMENTS

| RE18,323 E | * | 1/1932 | Woodruff | 105/457 |
| 2,362,657 A | * | 11/1944 | Meyer | 29/469.5 |
| 3,158,383 A | * | 11/1964 | Anderson et al. | 280/837 |
| 3,163,435 A | * | 12/1964 | Krueger et al. | 280/832 |

(Continued)

FOREIGN PATENT DOCUMENTS

| EP | 1972420 A1 | * | 9/2008 |
| FR | 2595999 A1 | * | 9/1987 |
| GB | 2013624 A | * | 8/1979 |

OTHER PUBLICATIONS

International Search Report dated Aug. 30, 2010, 14 pages.

(Continued)

*Primary Examiner* — Joseph M Rocca
*Assistant Examiner* — Daniel Yeagley
(74) *Attorney, Agent, or Firm* — Seyfarth Shaw LLP

(57) ABSTRACT

An intermodal tank container and complementary chassis, and features and methods for use thereof, are disclosed. The intermodal tank container and chassis has an appearance and length substantially similar to a non-intermodal OTR tank trailer, while affording the same capacity as an intermodal tank container. The design of the tank container allows for an improved, lighter design for the chassis and for improved usability of the tank container in intermodal environments such as with rail cars. The reduced weight of the chassis allows for a greater payload while remaining within various applicable legal restrictions for gross vehicle weight, axle weight, etc.

4 Claims, 22 Drawing Sheets

(56) References Cited

U.S. PATENT DOCUMENTS

| | | | | |
|---|---|---|---|---|
| 3,450,066 A | * | 6/1969 | Kasprzycki et al. | 410/68 |
| 3,937,337 A | | 2/1976 | Irving | |
| 3,971,491 A | | 7/1976 | Mowatt-Larssen et al. | |
| 4,100,720 A | * | 7/1978 | Carnewal et al. | 56/14.6 |
| 4,441,678 A | * | 4/1984 | Dorpmund | 248/146 |
| 4,729,570 A | * | 3/1988 | Welch, Jr. | 280/837 |
| 4,955,956 A | * | 9/1990 | Gerhard | 220/562 |
| 5,082,304 A | | 1/1992 | Preller et al. | |
| 5,083,673 A | * | 1/1992 | Fossey | 220/1.5 |
| 5,217,209 A | * | 6/1993 | Anders | 254/419 |
| 5,390,806 A | * | 2/1995 | Elston et al. | 220/1.5 |
| 5,538,286 A | * | 7/1996 | Hoff | 280/837 |
| 5,688,086 A | * | 11/1997 | Menzemer et al. | 410/68 |
| 5,722,688 A | | 3/1998 | Garcia | |
| 5,782,493 A | | 7/1998 | Bolton et al. | |
| 5,911,337 A | | 6/1999 | Bedeker | |
| 5,960,974 A | * | 10/1999 | Kee et al. | 220/1.5 |
| 6,012,598 A | | 1/2000 | Antoniou | |
| 6,508,378 B1 | * | 1/2003 | Maeda et al. | 220/560.07 |
| 6,527,134 B2 | * | 3/2003 | Hinkle et al. | 220/1.5 |
| 7,056,081 B2 | * | 6/2006 | Kelly | 414/792.9 |
| 7,214,028 B2 | * | 5/2007 | Boasso et al. | 414/812 |
| 7,624,885 B2 | * | 12/2009 | Pfau | 220/1.5 |
| 8,240,495 B2 | * | 8/2012 | Ronci et al. | 220/4.33 |
| 2003/0020253 A1 | * | 1/2003 | Bosman et al. | 280/164.1 |
| 2005/0056644 A1 | * | 3/2005 | Tatina | 220/23.6 |
| 2005/0169737 A1 | * | 8/2005 | Yan | 414/498 |
| 2005/0217229 A1 | * | 10/2005 | Richman et al. | 56/10.2 R |
| 2006/0239804 A1 | | 10/2006 | Trescott | |
| 2007/0238166 A1 | | 10/2007 | McNelly | |
| 2008/0067855 A1 | | 3/2008 | Morten | |
| 2008/0134589 A1 | | 6/2008 | Abrams et al. | |
| 2010/0039272 A1 | * | 2/2010 | Kowalchuk | 340/612 |

OTHER PUBLICATIONS

Photos of Schneider tanker truck, Jun. 2009.

The Greenbrier Companies, Technical Bulletin Stack Car, All-Purpose 53' Double Stack Car, Jun. 2009.

The Greenbrier Companies, Technical Bulletin Stack Car, Husky-Stack 53' Container Car, Jun. 2009.

Union Pacific Bulktainer, the New American Tank Truck brochure, Jun. 2009.

Examiner's Report dated Mar. 1, 2013 in Applicant's corresponding Canadian Pat. App. No. 2,765,684.

\* cited by examiner

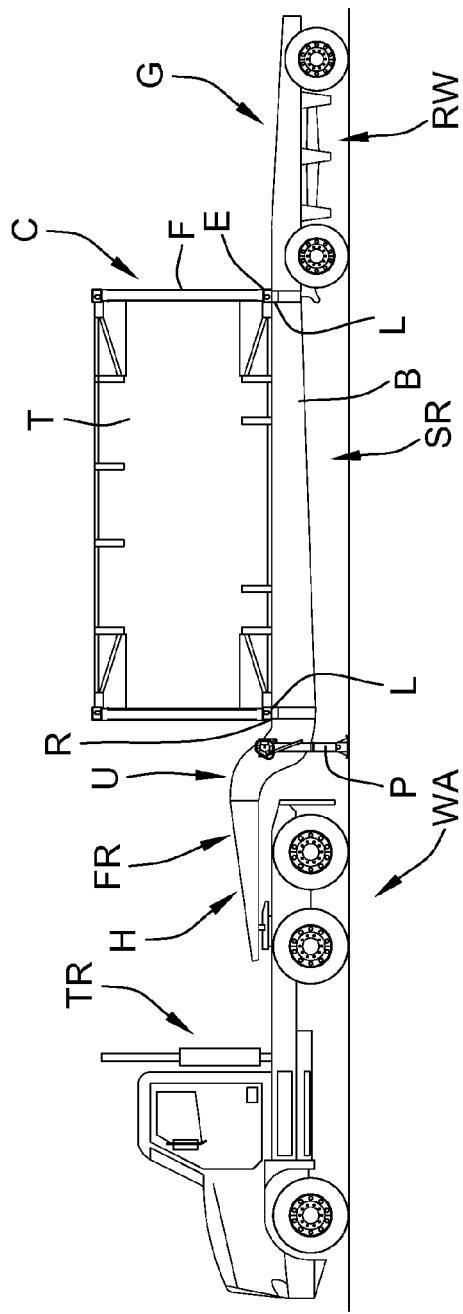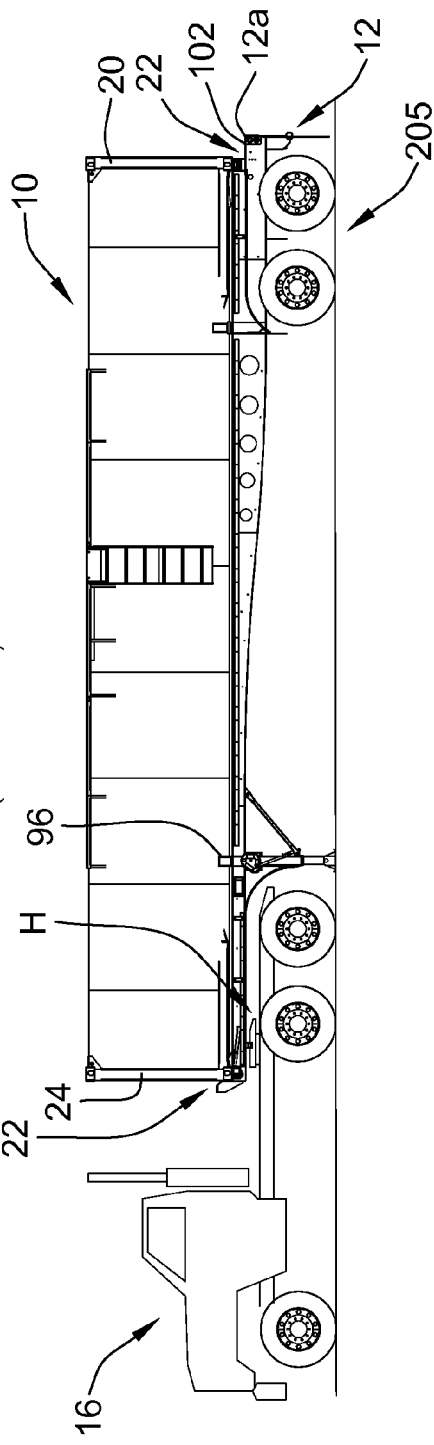
FIG. 1 (PRIOR ART)
FIG. 2

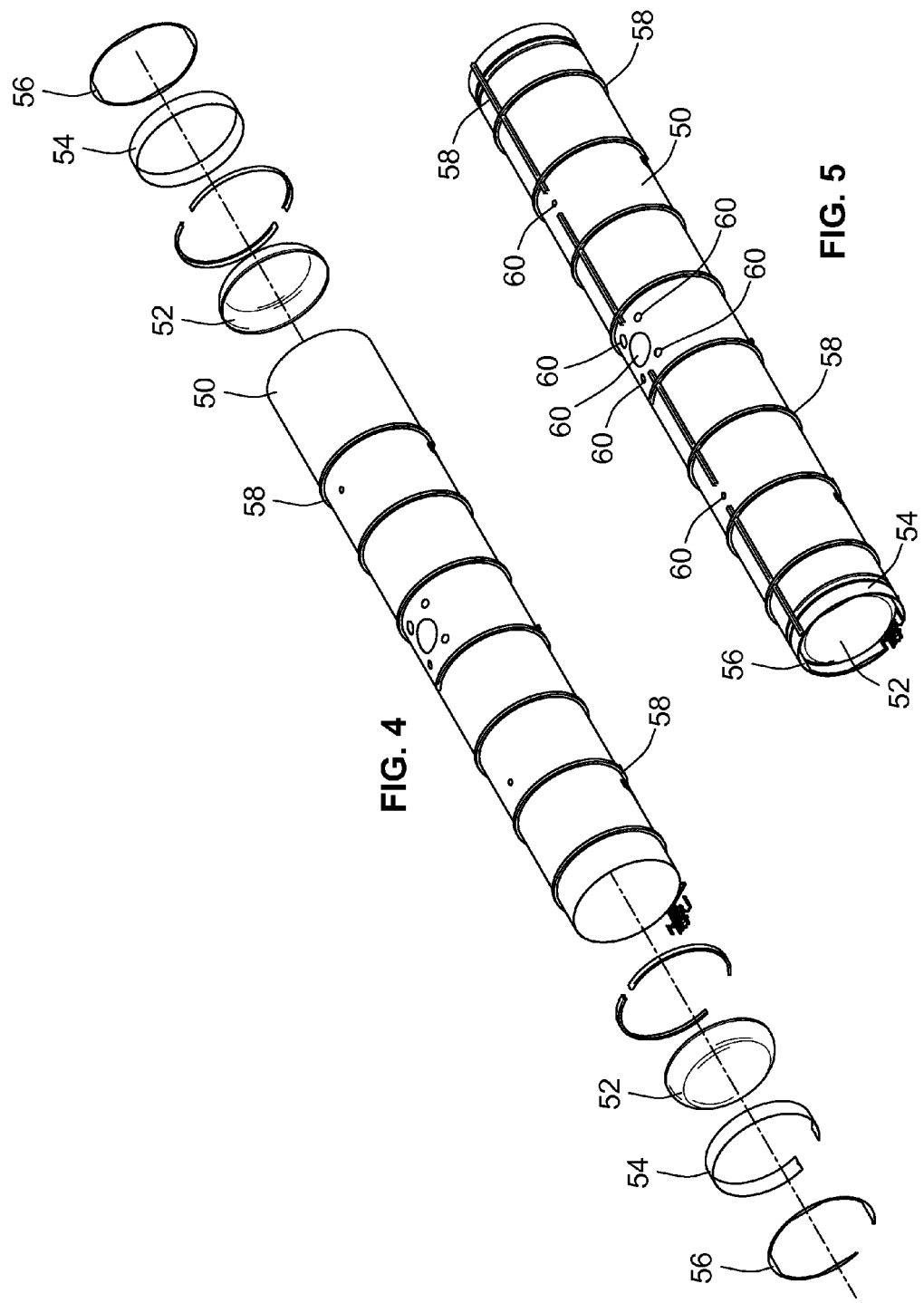

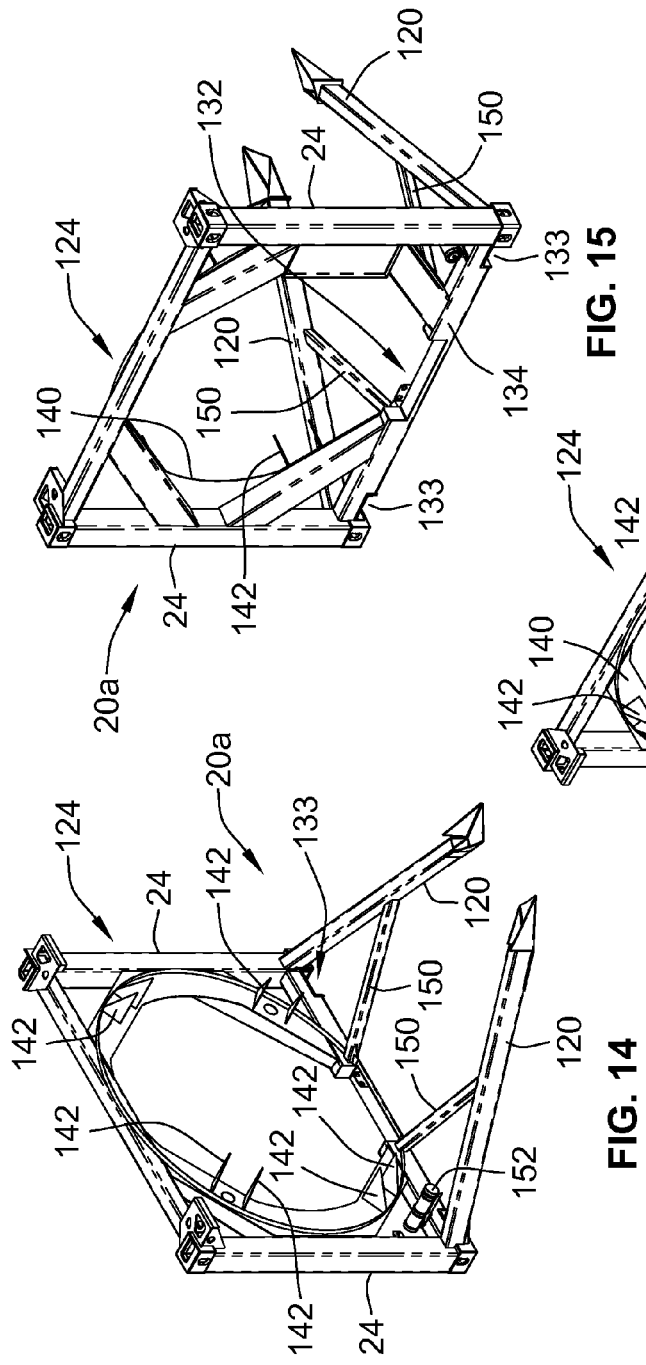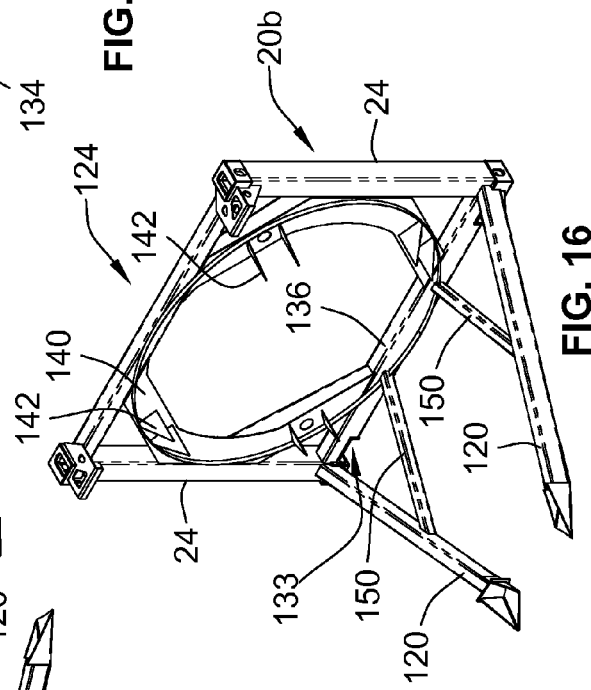

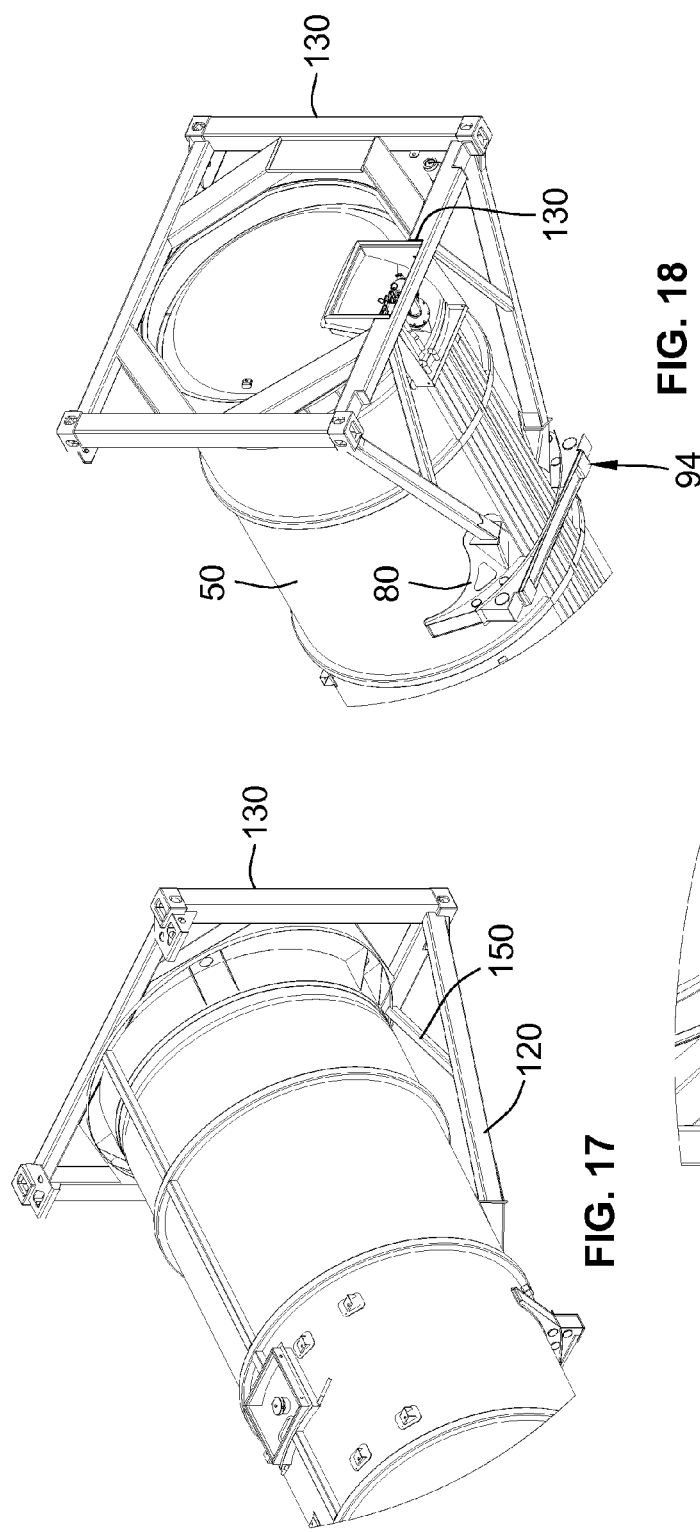

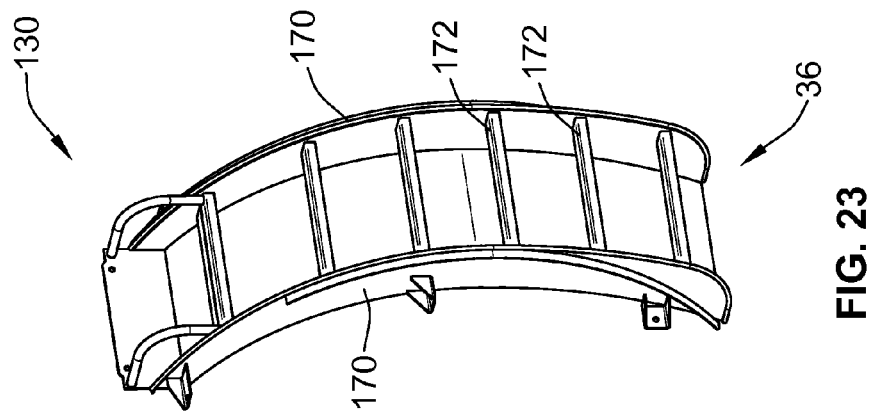
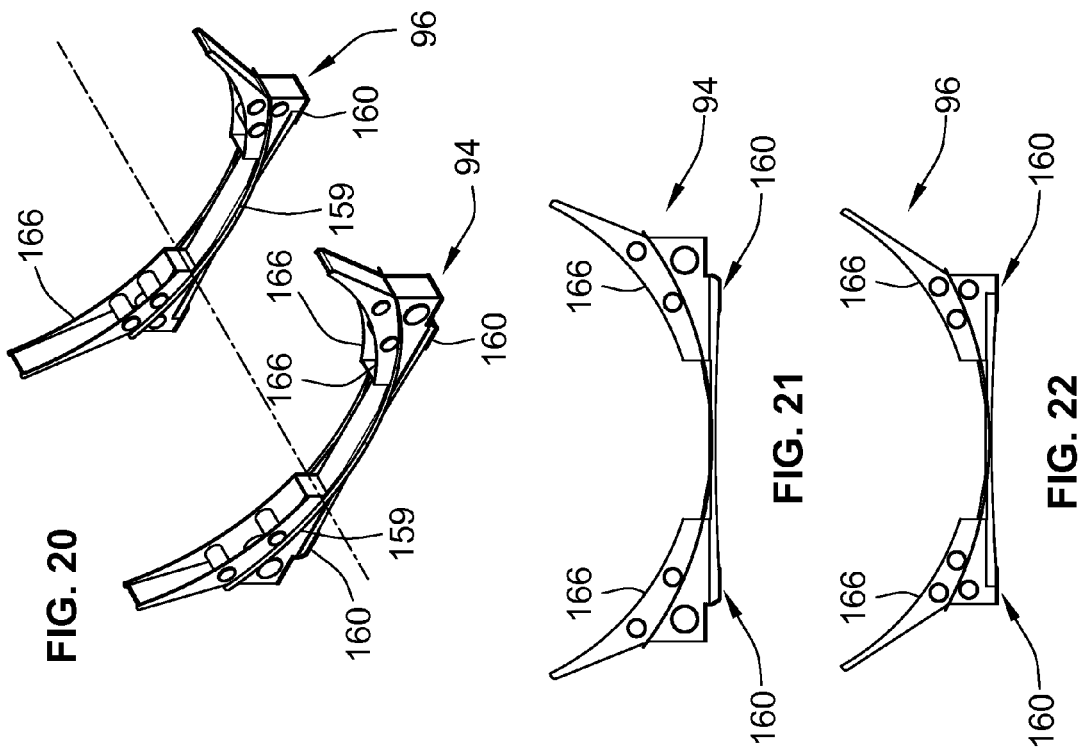

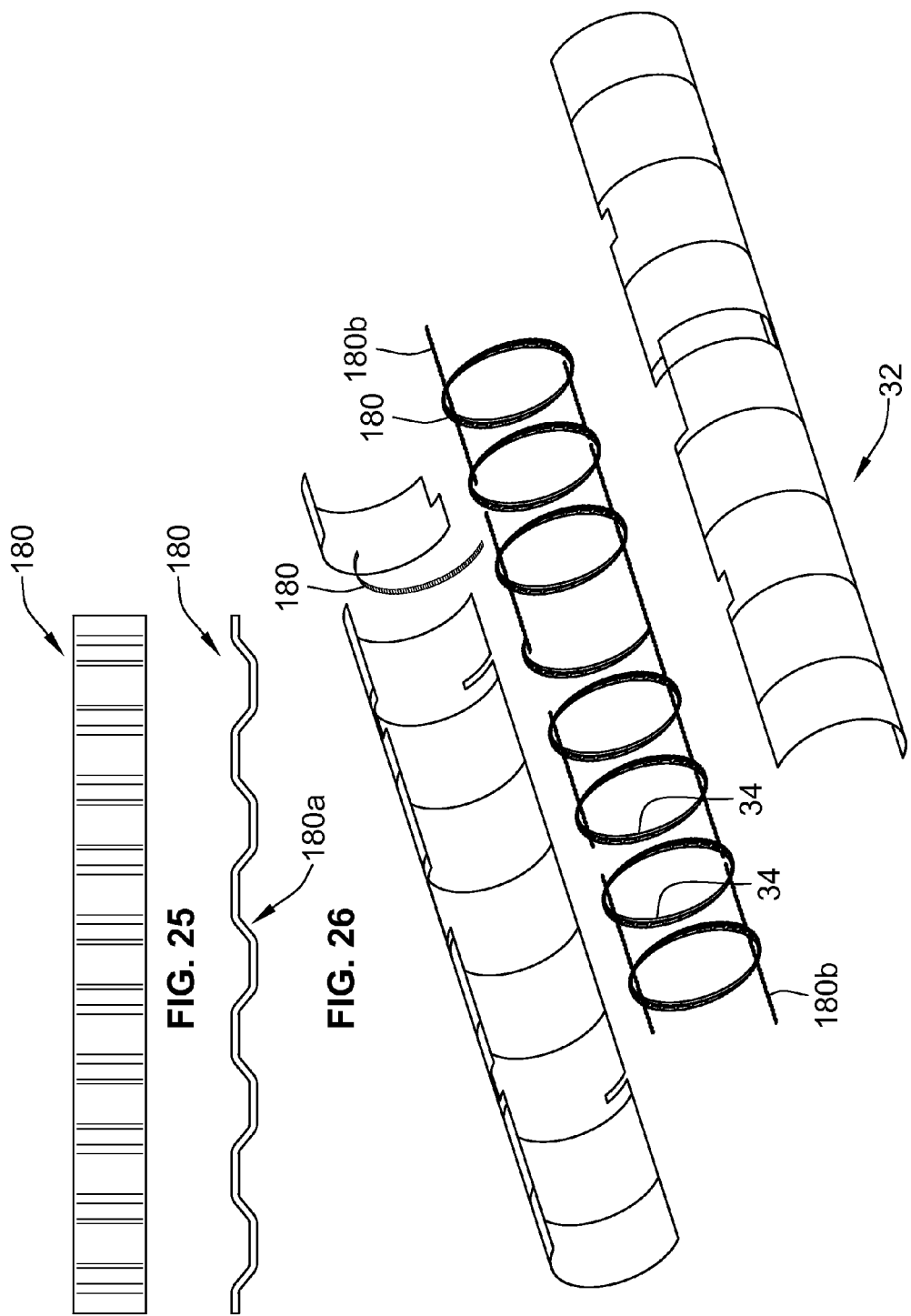

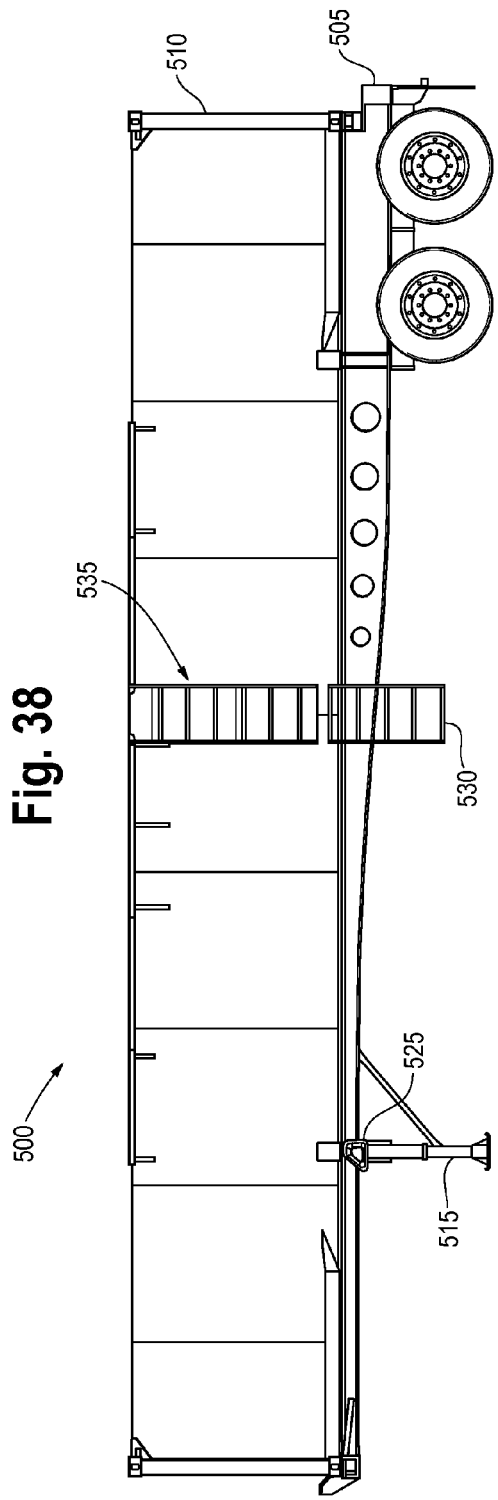

INTERMODAL TANK TRANSPORT SYSTEM, COMPONENTS, AND METHODS

CROSS-REFERENCE TO RELATED APPLICATION

The present application claims benefit of U.S. provisional application No. 61/269,083, filed Jun. 18, 2009, the entirety of which is incorporated herein by reference.

FIELD OF THE INVENTION

The invention relates to a bulk material container in the form of a tank container for storing and transporting liquid or the like and, in particular, to a tank container adapted for intermodal use, relates to other components therefor including a truck chassis and a rail well car, and relates to methods of intermodal transport.

BACKGROUND

Bulk shipping may generally be classified into several types based on the material being transported. For instance, pelletized material (such as bulk polymer) or mined material (such as coal) may be carried by a hopper car that allows for quickly depositing its payload into a receptacle. Such hopper cars are unsuitable for carrying dry cargo such as palletized loads which are generally shipped via trailer or dry container having a generally rectangular shape and compartment. Either is unsuitable for the third major category of material, specifically liquid.

The term intermodal transport as used herein refers to transporting bulk loads stored or loaded in containers without unloading the container. For instance, a container may be filled with loaded pallets, transported from a first site via over-land truck and container chassis, and then loaded onto a ship or railcar for further transport, likely subsequently loaded onto a second delivery truck and container chassis for delivery to its final destination. Throughout, the materials in the container remained loaded.

Intermodal transport standards are maintained by the International Standards Organization (ISO). Intermodal transport has received various contributions from around the world, including the United Kingdom, Canada, and the United States, and the ISO standards evolved from US Department of Defense standardization for military use.

Since about 1984 a form of intermodal transport known as "double-stack rail transport" has been used. As its name implies, this form only applies to rail transport, and this form involves stacking one container on top of another. The rail car itself is a either a flat car or a well car (that is, a railcar having a "well") for partially receiving a bottom container therein.

For dry good transport, these stackable containers are the most common form of intermodal transport, though they need not always be stacked. The stackable containers are typically 8' or 8'6" wide, by 8', 8'6", or 9'6" high, with a length of 20', 40', 48', or 53', though other heights have been considered. A container 9'6" inches in height is commonly referred to as a "high cube" container and may be double stacked for total height of 19', which is generally the maximum permitted under applicable legal restrictions. Each container is provided with support points, and the location of the support points is standardized so weight is properly transferred through the stacked containers. For instance, a 53-foot container may be placed on top of a pair of 20-foot containers, the top container having supports 40 feet apart aligned with the outer corners of the bottom containers.

Liquid transport requires a tank container that differs from dry goods containers for obvious reasons. The approach for intermodal tank containers has been to size the tank within a frame that mimics the construction of the dry goods container. To be specific, the overall dimensions of tank containers have been made to conform to those of dry goods containers. A typical tank container includes a frame surrounding the actual tank or vessel. The frame is eight feet by eight feet, six inches, and provides the container with an overall length of 20 feet, the tank container thus being sized essentially the same as a 20-foot dry goods container including support points. One benefit of a tank container having these dimensions is that it allows the tank container to be used on an intermodal rail car and in combination with dry goods containers. In other words, intermodal tank container development began with mimicking the dry goods container primarily for international transport, and everything else related to these tank containers grew from there.

This developmental mentality has produced a number of detriments, many of which are direct products of these design constraints. With respect to total costs, it is important in bulk shipping that little available payload is wasted on a per run basis. The tank within the frame is sized to maximize the space available, and a typical prior art tank container 20 feet in length carries a maximum of 26,000 liters with a product payload weight of 48,000 pounds or less due to US federal highway gross weight restrictions, bridge laws, and axle load restrictions, collectively referred to herein as the applicable legal restrictions. In greater detail, a gross vehicle weight is not permitted to exceed 80,000 pounds, which includes the tractor, the payload, and either the chassis and container or the integrated non-intermodal trailer.

While such tank container is generally matched in overall dimension to the shortest size of dry goods containers, the weight still exceeds that of the largest dry goods containers which are limited by the applicable legal restrictions. In order to accommodate such tank container on over-land truck use, a chassis is provided that is significantly different from that employed for dry goods use.

A chassis for dry goods use, along with a container thereon, gives a casual observer the impression of a typical semi tractor-trailer arrangement. One would see a semi tractor with a driver's cab, a chassis with the container thereon that looks like a typical non-intermodal trailer, and a fifth wheel hitch connecting the two. The overall height, width, and length of the chassis and container are substantially similar to that of the non-intermodal trailer. The intermodal dry goods container is lowered and secured onto the chassis after removal from a ship, or a railcar, or another truck, etc., transported to another location, and then removed from the chassis, while the standard trailer is loaded and unloaded at each point (often being laden with palletized loads).

In considering the chassis for a prior art intermodal tank container, the two things that should be recognized are the container's laden weight, both in relative terms to a laden dry goods container and in gross terms, and the overall shape of the tank. As discussed above, the loaded tank container is much heavier than a loaded dry goods container, and the chassis for a dry goods container is designed only to accommodate the weight of the dry goods container. At only 20 feet in length versus a 40-foot dry goods container, the greater weight of the loaded tank container is over a smaller length. Accordingly, a chassis for a tank container is specially designed for these physical characteristics.

A tank chassis is commonly referred to as a gooseneck, drop-deck chassis due to its shape and lower deck height. Longitudinally extending supports or beams span between a rear wheel assembly and the hitch connection. Because the weight of the tank container is concentrated over the 20 foot span of the container, these beams are much larger and stronger than for a dry goods chassis. The gooseneck shape and drop deck feature are results of the transported material being liquid: liquid moves around during transport, and this weight shifting combines with effects from being elevated to produce lateral forces that threaten rolling of the tank and chassis. The gooseneck and drop deck features lower the center of gravity of the tank container and, hence, the combination of the tank container and chassis to make the combined load more stable. In fact, the bulk of the weight of the beams is positioned between the rear wheel assembly of the chassis and a rear wheel assembly of the semi tractor, below the hitch connection.

While providing the tank container with the minimal overall dimensions of the smallest dry goods container, the resulting 20 foot tank container is nonetheless heavier than a 40 or 53 foot dry goods container, requiring a purpose specific chassis to be utilized. While a tank container chassis is much more expensive to build, it is unsuitable for use with dry goods containers (other than 20 foot dry goods containers).

As noted above, the gross vehicle weight is restricted by the applicable legal restrictions to 80,000 pounds. For a prior art intermodal container tank container and its accompanying tractor and chassis, the weight of the payload is generally in the range of 46,000 pounds to 48,000 pounds, which is partly restricted by the weight of the heavy gooseneck, drop-deck chassis required. For non-intermodal trailers, a similar range of payload weight is also achieved, largely due to the requirement of the larger tractor/sleeper necessary for OTR applications.

For prior art intermodal tank chassis, a special type of suspension is generally required, known as a spread axle rear tandem suspension that meets the US applicable legal restrictions. Under the gross vehicle weight restrictions, the 80,000 pounds is allotted to 12,000 pounds over the tractor front axles, 34,000 over the tractor rear axles (i.e., proximate the hitch connection), and 34,000 over the trailer/chassis rear axle pair. However, the prior art intermodal tank and chassis concentrates too much weight at the tractor rear axles. There is an exception to the 34,000 pounds on the rear axle for the spread axle rear tandem set up: by shifting the front axle of the two axles of the chassis rear pair to a 9'1" spread (as opposed to the typical 49" spread), one is permitted to have up to 39,000 pounds on this pair, as the weight is distributed over a greater area.

The spread axle rear tandem suspension is virtually required for an intermodal tank chassis. However, these systems are heavier, more expensive to operate, cause excessive tire wear, and are less maneuverable than a standard closed tandem suspension.

It should also be noted that, generally speaking, containers less than 40 feet present issues for stacking in rail cars. A pair of 20 foot containers are not stacked on top of a 40 or 53 foot container. The larger container does not have intermediate support points for the interior ends of the shorter containers. So, 20 foot containers (including all prior art intermodal tank containers) need to be either on the bottom of a stacked arrangement or on top of another 20 foot container. For this reason, the need to transport a single or odd number of 20 foot containers results in wasted rail capacity.

Accordingly, there has been a need for an improved intermodal tank container, an improved chassis for intermodal tank containers, and related components and methods for using intermodal tank containers.

SUMMARY

In accordance with an aspect, a tank container for intermodal liquid tank transport is disclosed including a single tank vessel having a non-rectangular cross-section for storing and discharging liquid, a manway for access to the interior of the vessel, the manway disposed on the top of the vessel, and a discharge valve mounted at a rear portion of the vessel, including a front frame secured at least to a front end of the vessel, the front frame having at least two vertical supports capable of supporting another intermodal container, and including a second frame secured at least to a rear end of the vessel, the front frame having at least two vertical supports capable of supporting another intermodal container, wherein the vessel is mounted between the frames, the tank container has a length and a width that position the vertical support posts at approximately 8 feet apart in a lateral direction and approximately 40 feet apart in the longitudinal direction in accordance with ISO intermodal shipping container standards, and the tank container is no greater than approximately 6 feet, 4 inches, in height.

In some forms, the front frame and rear frame are mounted directed to the vessel, the sides of the vessel are generally free of frame members running the length of the tank container, the tank container further including a ladder mounted to a lateral side of the tank container proximate the manway.

In some forms, the tank container further includes a cladding system mounted to an exterior surface of the vessel, the cladding system defining the exterior of the tank container in the region between the front and rear frames, the cladding system including spacers for securing portions of cladding material with the vessel, the spacers being formed with offset portions and of a polymeric material so as to be resiliently deformable.

In some forms, the vessel holds at least 26,000 liters of liquid.

In other forms, different vessels may hold between 20,000 liters and 27,000 liters. In such other forms, a diameter is provided for the vessel such that the payload is approximately 80% or greater of the available volume.

In another aspect, an arrangement for intermodal liquid transport is disclosed including a chassis adapted for hitch connection with a tractor, the chassis having a rear wheel assembly, a pair of straight, generally parallel beams defining a generally flat upper surface for removably receiving an intermodal container, the flat upper surface providing a support of and extending at least 40 feet, the flat upper surface extending to and between a point at least above the rear wheel assembly and a point forward of the hitch connection, a front crossbeam extending laterally between the parallel beams and located at a forward region of the flat upper surface and forward of the hitch connection, and a rear crossbeam extending laterally between the parallel beams and located at a rearward region of the flat upper surface and rearward of the rear wheel assembly, and including a tank container no greater than approximately 6 feet, 4 inches, in height, the tank container removably supportable by the chassis on the front and rear crossbeams thereof, the tank container having a front frame and a rear frame each having a pair of vertical support posts mateable with the front and rear crossbeams in a predetermined position, the vertical supports defining a footprint of 40 foot in length and 8 feet in width in accordance with ISO standards for intermodal container stacking, and a single tank vessel for storing and discharging liquid, the vessel mounted between the frames. The width of the tank container may exceed the width of the vertical supports, such as by being 102" wide.

In some forms, the vertical supports conform to railroad stacking standards to permit stacking of three like tank containers by aligning the vertical supports. At 6'4" in height for each tank container, three-high is within the current height limit of 19', the same height used for stacking two 9'6" high-cube dry containers.

In some forms, the chassis further includes a rear, intermediate crossbeam extending laterally between the parallel beams, and the tank container further includes a rear support disposed on the tank container to be received in a mating relationship with the structure proximate the rear, intermediate crossbeam, each of the front, rear, and rear intermediate crossbeams including structure for preventing lateral shifting of the tank container relative to the chassis.

In some forms, each of the front and rear crossbeams include ramp surfaces for guiding positioning of the tank container when removably lowered onto the chassis.

In some forms, the front and rear crossbeams include structure allowing the chassis to lock with the tank container, and the rear intermediate crossbeam is a passive structure engaged and disengaged only by action of the raising or lowering the tank container relative to the chassis.

In some forms, the chassis further includes a front, intermediate crossbeam and a pair of landing gear positioned at the intermediate crossbeam, and the tank container further includes a front support positioned to engage the front, intermediate crossbeam, the weight of the tank container being supportable at the front, intermediate crossbeam and landing gear when the chassis is separated from a tractor hitch.

In another aspect, a tank container for storing and transporting liquid is disclosed, the tank container removably disposable with a rail car and with an OTR chassis having front, rear, and at least a first intermediate crossbeams, each crossbeam having structure for receiving a portion of the tank container therebetween for resisting lateral forces due to liquid in the tank container, the tank container including a single tank vessel having a non-rectangular cross-section for storing and discharging liquid, a front frame secured at least to a front end of the vessel, the front frame having at least two vertical supports capable of supporting another intermodal container, and a second frame secured at least to a rear end of the vessel, the front frame having at least two vertical supports capable of supporting another intermodal container, wherein the vessel is mounted between the frames, the tank container having a length and a width that position the vertical support posts at approximately 8 feet apart in a lateral direction and approximately 40 feet apart in the longitudinal direction in accordance with ISO intermodal shipping container standards, and the tank container being no greater than approximately 6 feet, 4 inches, in height.

In some forms, the vessel has a length less than 40 feet, has a height no greater than 6'4", and has a capacity between approximately 26,000 liquid liters and approximately 27,000 liquid liters. As noted, a capacity for some vessels may be in the range of 20,000 liters to 27,000 liters.

In another aspect, a chassis for use with an intermodal tank container is disclosed, the chassis adapted for hitch connection with a tractor and including a rear wheel assembly, a pair of straight, generally parallel beams defining a generally flat upper surface for removably receiving an intermodal container, the flat upper surface providing a support of and extending at least 40 feet, the flat upper surface extending to and between a point at least above the rear wheel assembly and a point forward of the hitch connection, a front crossbeam extending laterally between the parallel beams and located at a forward region of the flat upper surface and forward of the hitch connection, a rear crossbeam extending laterally between the parallel beams and located at a rearward region of the flat upper surface and rearward of the rear wheel assembly, and a rear, intermediate crossbeam extending laterally between the parallel beams, wherein each of the crossbeams including structure for receiving a portion of the tank container therebetween in a mating relationship to resist lateral forces from shifting of liquid in the tank container.

In some forms, the chassis further includes a front, intermediate crossbeam and a pair of landing gear positioned at the intermediate crossbeam for supporting the weight of the tank container when the chassis is separated from a tractor hitch.

In some forms, the chassis further includes an air ride system capable of raising or lowering at least a rear end of the chassis to assist in fully discharging from the tank container when received on the chassis.

In another aspect, an arrangement for intermodal liquid tank container usage is disclosed including a chassis having a rear end, a rear wheel assembly disposed proximate and forward of the rear end, a front end, a hitch connection disposed proximate and rearward from the front end, the hitch connection for connection with a tractor, landing gear for supporting the chassis and tank container thereon when the chassis is not supported by a tractor, a front crossbeam including structure for mating with the tank container, the front crossbeam located forward of the hitch connection and at the front end, a rear crossbeam including structure for mating with the tank container, the rear crossbeam located proximate the rear end, and a pair of straight beams extending between the front end and rear end and secured with the front and rear crossbeams, and including a tank container at least 40 feet in length, 8 feet or 8 feet, 6 inches, in width, and no greater than approximately 6 feet, 4 inches, in height, the tank container removably supportable by the front and rear crossbeams of the chassis, the tank container having a non-rectangular vessel extending generally the entire length of the tank container and capable of storing liquid therein, and frame portions at front and rear ends of the tank container securable with the front and rear crossbeams respectively, wherein the vessel and straight beams have a sufficient strength for resisting lateral forces exerted on the arrangement by liquid movement within the vessel.

In some forms, the chassis includes an air ride system for raising and lowering the rear end of the chassis.

In some forms, the front and rear crossbeams include a pair of vertical portions, a portion of each respective frame is received between the vertical portions, and the vertical portions are received within notches of the frame.

In some forms, the chassis further includes at least one intermediate crossbeam located proximate the landing gear, and the tank container includes at least one intermediately positioned support received by the chassis at the intermediate crossbeam when the tank container is positioned on the chassis, and the intermediately positioned support is laterally constrained by structure at the intermediate crossbeam when the tank container is positioned on the chassis.

In some forms, the chassis has a height comparable with a non-intermodal OTR tank trailer, the chassis includes a fifth wheel hitch connection, the chassis includes an air ride suspension system operable to position a rear of the chassis from approximately 54" during driving operation and storage and to position the rear of the chassis at approximately 50" during discharge of the tank container vessel, and the chassis includes a rear, intermediate crossbeam, wherein the front and rear crossbeams each have ramped surfaces for guiding the front and rear frames of the tank container into proper position.

In some forms, the frame portions include front and rear frames each including a crossbar for mating with the respective front and rear crossbeams of the chassis, the tank container including a storage capacity of approximately 20,000 to 27,000 liters, and including a cladding system including polymeric spacers between the vessel and the cladding, the polymeric spacers being resiliently deformable.

In another aspect, a method for transporting liquid is disclosed including the steps of providing a non-rectangular vessel for receiving and discharging of the liquid, adapting a frame system on the vessel including providing vertical support posts at ISO standard positions of approximately 8 feet by 40 feet, selectively disposing the vessel and frame system on and removing the same from transportation equipment.

In some forms, the step of selectively disposing includes at least one of the following: removably securing the vessel and frame system with a rail car, with another vessel and frame, or with an over the road tractor.

BRIEF DESCRIPTION OF THE DRAWINGS

In the Figures, FIG. 1 is a PRIOR ART side elevation of an intermodal tank transportation system including a tractor, a prior art gooseneck, drop-deck chassis, and a prior art tank container;

FIG. 2 is a side elevation view of a tank container of the present invention and a chassis of the present invention for supporting the tank connector, the chassis being connected by a hitch connection with a tractor;

FIG. 4 is a partially exploded perspective view of a vessel of the tank container showing head caps for closing ends of the vessel;

FIG. 5 is a perspective view of the vessel generally corresponding to FIG. 4 and showing a discharge assembly disposed at a rearward end of the vessel;

FIGS. 14 and 15 are inner and outer perspective views, respectively, of the rear frame of FIG. 13;

FIG. 16 is an inner perspective view of the front frame of FIG. 13;

FIGS. 17-19 are perspective fragmentary views of the vessel and the rear frame secured thereto;

FIG. 20 is a perspective view of a front and a rear support securable with the vessel for mating with the chassis;

FIG. 21 is a front elevation view of the rear support of FIG. 20;

FIG. 22 is a front elevation view of the front support of FIG. 20;

FIG. 23 is a perspective view of a ladder assembly securable with the vessel;

FIG. 24 is an exploded perspective view of the cladding system for the tank container including support rings and spacers for securing cladding sections with the vessel;

FIGS. 25 and 26 are side elevation views of a portion of a spacer having a series of offset portions for absorbing impact against the cladding;

FIG. 38 illustrates an embodiment of the intermodal tank container and chassis.

DETAILED DESCRIPTION

Figure 3:
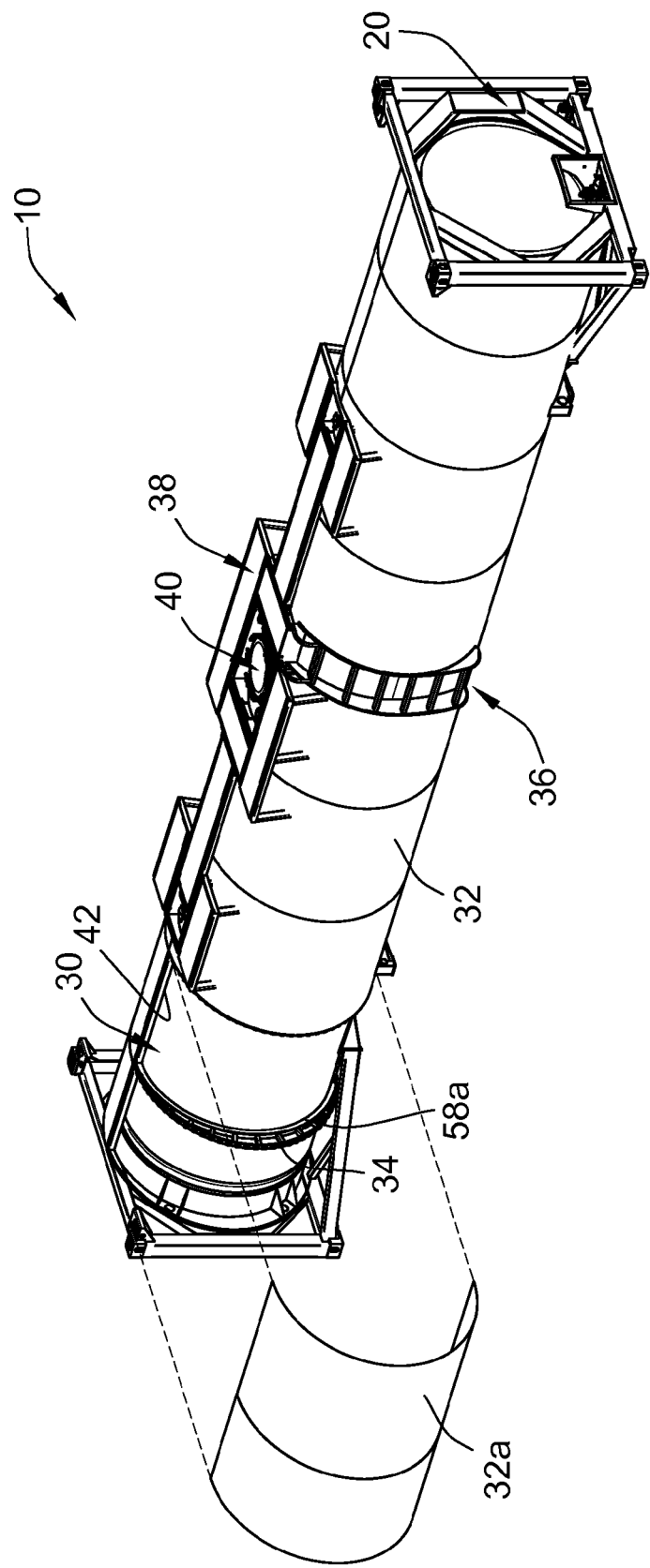
FIG. 3 is a perspective view of the tank container showing support frames on each end thereof and a section of cladding removed from the tank container to expose a cladding support and an internal tank.

As will be discussed in greater detail below, the present invention presents a novel approach to intermodal tank container design. In forms, the present invention includes, inter alia, a tank for storing and transporting and delivering liquid (hazardous or non-hazardous), a tank container incorporating the tank, and a chassis for over-land or over-the-road ("OTR") transport of the tank container. The tank capacity is equal to or greater than the capacity of a standard prior art intermodal tank container. At least the height of the tank container is reduced with respect to prior art intermodal tank containers. The length of tank container is approximately 40 feet or more allowing the tank container to be stacked in any fashion that a dry goods container may be and distributing the weight of the loaded tank container over the greater length. The reduction in height and increased length maintain the overall weight of the tank container, when loaded, within ISO standards. The weight distribution and height of the tank container combine with a novel chassis, enabling the chassis to be lighter than a standard gooseneck, drop-deck chassis. The ability of the tank container to be used intermodally allows standard drayage tractors to be used for transporting the combined tank container and chassis over land, allowing a larger payload.

Referring initially to FIG. 1, a prior art arrangement for intermodal transport of liquid is illustrated. A tank container C is shown having a frame F and a tank T mounted therein. The tank container C is 8 feet wide by 8 feet, 6 inches high, with an overall length of 20 feet. The empty tank container C weighs approximately 8,000 pounds and accommodates a maximum volume of 26,000 liters.

The tank container C is supported at its ends E on a gooseneck, drop-deck-style chassis G. As can be seen, the chassis G includes longitudinally extending beams B. The beams B have a rearward portion supported by rear wheel assembly RW and angle slightly downwardly in the forward direction therefrom through a support region SR on which the tank container C rests. The support region SR includes designated support points typically in the form of twistlocks L for simply and quickly aligning the tank container C during descent to the support region S and locking therewith.

Generally speaking, the beams B must be of a sufficient strength to support the concentrated weight of the loaded tank container C in the support region SR. In comparison to a dry goods chassis (not shown), the beams B are much larger and, consequently, heavier and more expensive. The chassis G takes the name "gooseneck, drop-deck" from its shape, specifically, the bend and upward shift U to the beams B leading to a forward region FR. This bend U forms an offset for the forward region F, and the beams B again require greater strength (and material and weight) to accommodate this bend U. A pair of landing gear in the form of posts P may be raised when connected to a tractor TR, though they are illustrated in a lowered position as would be used when the chassis G is disconnected from the tractor TR.

The overall geometry of the beams B is generally dictated by the weight of the load, and the various support points (ends E, posts P, rear wheel assembly RW), and the position of a hitch connection H. The hitch connection H is typically a fifth wheel connection supported over a wheel assembly WA of the tractor TR. In all, the bend U is required by the need to maintain the center of mass/gravity of the tank container C and the chassis G low enough to minimize outward rolling forces. The beams B require a large amount of strength due to the vertical load bearing requirements and geometry; additionally, the beams B must resist lateral forces (such as occur during turning of the tractor TR/chassis G) from the liquid in the tank container C shifting.

Due to these features, the prior art intermodal tank assembly is expensive in operation and in individual components. The weight of the chassis G is high due to the strength requirements for the beams B, totaling 7,690 pounds. As discussed, the gross vehicle weight is generally 80,000 pounds and the weight of the chassis G, including a spread axle rear tandem suspension (not shown), reduces the amount of payload that can be transported. For OTR trailers, one needs to use the larger, heavier OTR tractor/sleeper as the OTR distances are much greater, intermodal loads generally being short local routes. It should be noted that the Union Pacific rail company offers a service called BulkTainer in which Union Pacific arrives at a customer's site with tank containers, gooseneck, drop-deck chassis, and tractors, picking up the bulk materials to be transported, moving the loaded tank container to a train, transporting the tank container via rail to a destination location, and then delivering the tank container with a second chassis and tractor. In 20+ years, the BulkTainer service, has failed to achieve significant use due to the restrictive equipment from a weight standpoint, the lack of acceptance by users such as shippers and consignees and trucking community due to appearance and operation, and limits on payload.

FIG. 2 illustrates a general illustration of a form of intermodal tank container transportation in accordance with aspects of the present invention. An intermodal tank container 10 is illustrated as being secured on an intermodal OTR chassis 12, the chassis 12 being secured at a hitch connection 14 with a tractor 16.

The tank container 10 includes a frame 20 at each end 22, the frame 20 including vertical support posts 24 positioned longitudinally at 40 feet and 8 feet wide, so as to conform with ISO dimensions for both dry goods and liquid tank containers. Accordingly, the tank container 10 has generally the same footprint as stackable dry goods containers and can be combined with stackable dry goods containers and with rail well cars without regard to the type of the other containers.

However, the tank container 10 and its frame 20 are significantly reduced in height, to approximately 6 feet, 4 inches tall. Because the tank container 10 is 40 feet long, it does not need to be combined with a second container to form a full stack layer, as the prior art intermodal or other 20-foot container would require.

The chassis 12 is significantly reduced in weight in comparison to the prior art intermodal gooseneck, drop-deck chassis G. The chassis 12 weighs approximately 5,750 pounds, over 2000 pounds less than the gooseneck, drop-deck chassis G. This weight reduction is a significant materials cost savings. Considering the combined weight of the tank container 10 (loaded), the chassis 12, and the tractor 16 is approximately as being roughly the same 80,000 pounds as the prior art assembly of FIG. 1, the reduction in 2000 pounds due to the different chassis affords 2000 more pounds available for payload, while still remaining within the applicable legal restrictions. Additionally, the lighter drayage tractor can be used, as intermodal is local only (i.e., not OTR, through mountain passes, etc.).

Each of these features will be discussed in greater detail, beginning with the tank container 10 illustrated in FIG. 3. The components of the tank container 10 are the frames 20 positioned at each end 22, an internal tank or vessel 30, cladding 32, cladding supports 34, a ladder 36, a walkway 38, and a manway 40, as well as several additional components and fittings. FIG. 3 illustrates the tank container 10 with a portion 32a of the cladding 32 removed to expose the cladding supports 34 and the vessel 30. Intermediate the cladding 32 and the vessel 30 is insulation 42 as is known in the art and which may be, for instance, rockwool and may be multi-layered.

FIGS. 4 and 5 depict features of the vessel 30. The majority of the body of the vessel 30 is a tubular barrel 50 constructed in accordance with known techniques and materials in the field of the art. The barrel 50 is generally non-rectangular, preferably ovoid or cylindrical in cross-section, and by definition capable of storing liquid. Each end of the barrel 50 is closed by an end cap 52 welded to the barrel 50. Outboard from the end caps 52 are annular flange extensions 54 for mounting a face plate 56. Along the length of the barrel 50 a series of channel fittings 58 are mounted for securing the cladding 32 and including vacuum rings 58a. The barrel 50 has an approximate length of 40', including the end caps, an inner diameter of approximately 6'7.5" (1714 mm), a wall thickness of 4.4 mm, and an end cap thickness (head) of 4.8 mm to 5.0 mm. The vessel 30 has a total volume of approximately 27,000 liters, which is approximately 1000 liters more capacity than the prior art intermodal tank of FIG. 1.

Figure 6:
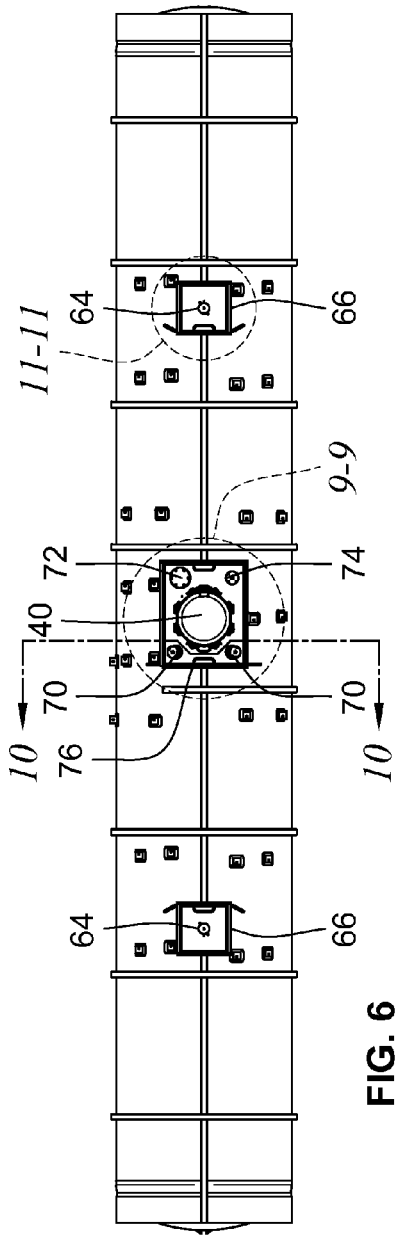
FIG. 6 is a top plan view of the vessel of FIG. 4 further showing a centrally located manway assembly and a pair of cleaning ports positioned longitudinally from the manway assembly.
Figure 11:
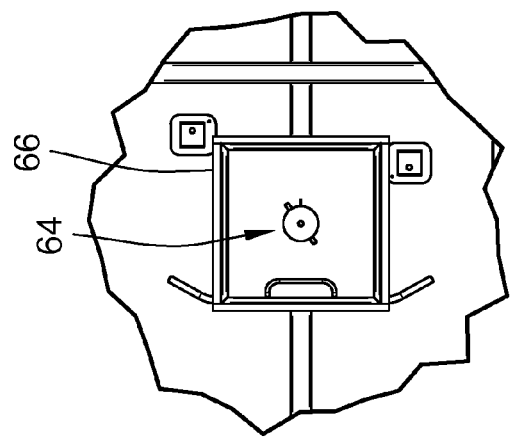
FIG. 11 is a top plan view of the detail 11-11 of FIG. 6 showing a cleaning port.

Comparing FIGS. 5 and 6, the barrel 50 has a number of openings 60 providing access to the interior of the barrel 50 for various fittings and accessories. Two of the openings 60 allow for rearward and forward cleaning ports 64, also illustrated in FIG. 11 with a box 66 therearound for protecting the ports 64. One of the openings 60 is sized for the manway 40 so that a human can enter and exit the interior of the vessel 30, such as might be done for repair, specialized cleaning, or inspection. Proximate the manway 40 is a pair of pressure release valves 70, a secondary or spare top discharge port 72, and an air valve 74. A central box 76 surrounds the manway 40 and the nearby fittings.

Figure 7:
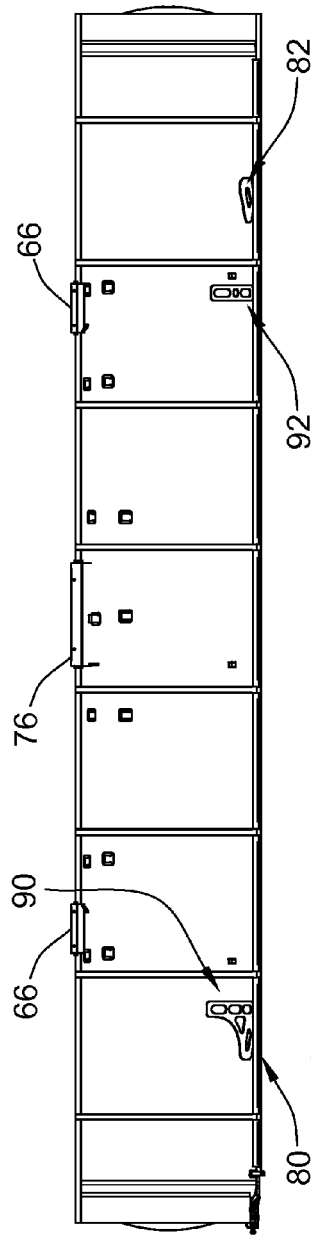
FIG. 7 is a side elevational view of the vessel of FIG. 6 showing forward and rearward mounting brackets for securing respective forward and rearward frames.
Figure 8:
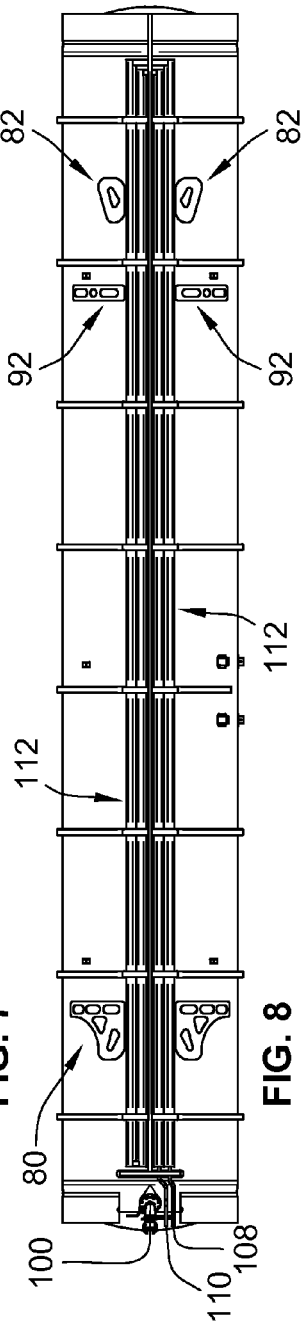
FIG. 8 is a bottom plan view of the vessel of FIG. 6 showing the forward and rearward mounting brackets in pairs and showing a plurality of steam runs extending longitudinally along the length of the vessel and terminating at the vessel rearward end steam inlets and outlets.

FIGS. 7 and 8 illustrate additional structures for mounting the frames 20 with the vessel 30. A rear bracket 80 and a forward bracket 82 are shown in FIG. 7 and are shown with respective paired brackets 80, 82 in FIG. 8. These brackets 80, 82 are generally arcuate so as to follow and secure with the exterior contour of the barrel 50. Brackets 80, 82 receive legs 120 from the front and rear frames 20a, 20b, as shown in greater detail in FIG. 13.

FIGS. 7 and 8 also illustrate the rear brackets 80 including structure 90 for mating with a rear support 94, and illustrate a support bracket 92 for mating with a front support 96, the rear support 94 and front support 96 detailed in FIGS. 20-22. The supports 94, 96 (also referred to herein as "first and second tank supports"), provide several functions. Referring back to FIG. 2, it can be seen that the front support 96 is positioned over the landing gear 98 so that when disconnected from the tractor 16 the weight of the vessel 50 and the tank container 10 is transmitted directly to the landing gear 98. The rear support 94 is positioned so that it is a short distance in front of the rear wheel assembly 99 of the chassis 12. As will be discussed in greater detail below, the supports 94, 96 are passively connected with the chassis 12 so as to resist lateral (horizontal plane) bending forces on the tank container 10.

A principle discharge port 100 is provided at the rearward of the tank container ends 22. As points of reference, the discharge port 100 can be seen illustrated in FIGS. 3, 8, and 12. The discharge port 100 is positioned proximate a short deck 102 (FIG. 2) when the tank container 10 is disposed on the chassis 12, which is akin to a standard non-intermodal trailer so that a user can operate the discharge port 100 from the rear of the tank container 10 and chassis 12. In contrast, a discharge (not shown) on the intermodal tank container C is located approximately and 13 to 15 feet from the rear end of the chassis G.

Figure 12:
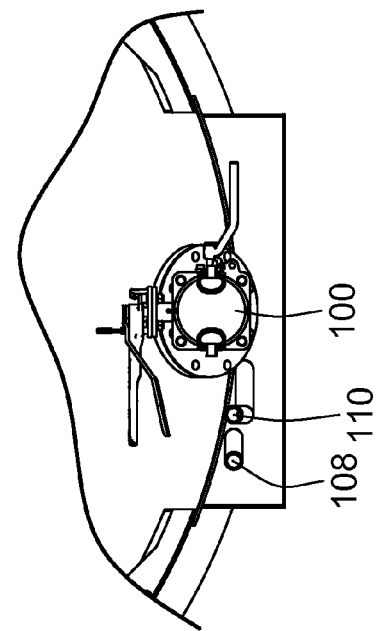
FIG. 12 is a side elevation view of the rearward end of the vessel showing the steam inlet and outlet, and showing a discharge valve.
Figure 9:
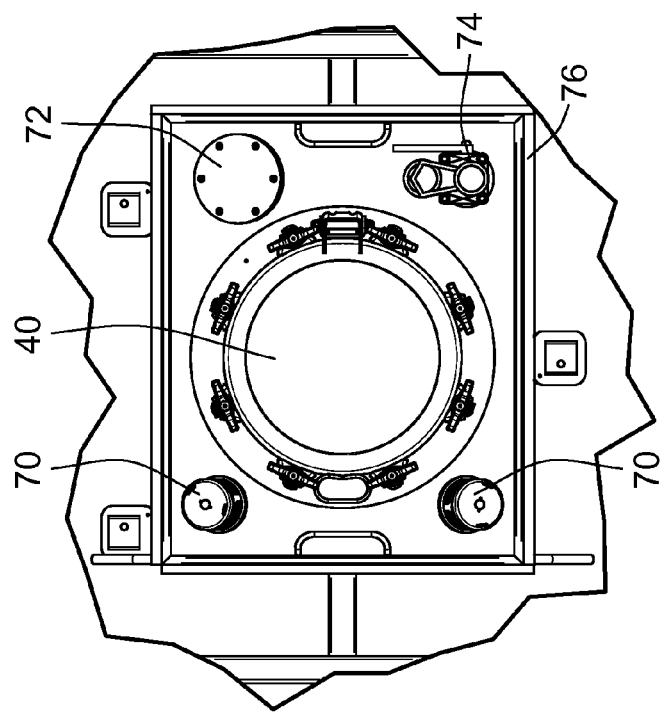
FIG. 9 is a top plan fragmentary view of the detail 9-9 of FIG. 6 showing a manway assembly with a pair of pressure release valves located proximate thereto, a top discharge port, and an air valve.
Figure 10:
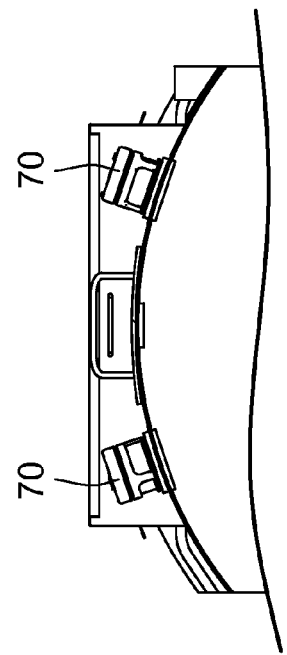
FIG. 10 is a side elevation view taken through the line 10-10 of FIG. 6 showing the position and arrangement of the pressure release valves of FIG. 9.
Figure 13:
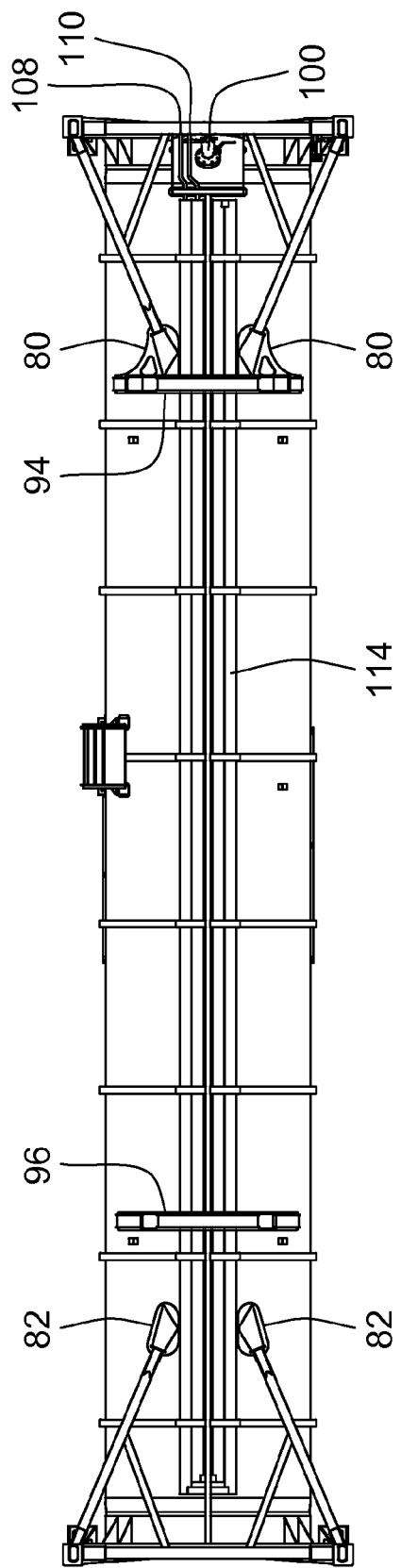
FIG. 13 is a bottom plan view of the vessel with the frames secured with the forward and rearward mounting brackets and intermediate passive restraints in the form of tank supports.

Adjacent the discharge port 100 are a steam inlet 108 and a steam outlet 110, as seen in FIGS. 12, 13, and 19. The steam inlet 108 and steam outlet 110 are connected to a steam line 112 best seen in FIG. 8. Steam can be input at the steam inlet 108 and makes essentially four longitudinal trips along the length of the barrel 50 before reaching the steam outlet 110: a first trip from rear to front, a first return, a second rear to front trip, and a final return to the outlet 110. In FIG. 13, the steam line 112 is shown as being channel tubing 114 welded directly to the barrel 50.

The frames 20 are shown connected with the vessel 30 in FIG. 13 and shown separately as rear frame 20a in FIGS. 14 & 15 and as front frame 20b in FIG. 16. As can be seen, each frame 20 includes a pair of legs 120 extending inwardly relative to the longitudinal direction of the vessel 30 and extending inboard towards the center of the vessel (i.e., towards the midpoint along the length of the vessel). The legs 120 secure with the brackets 80 and 82. A rectangle 124 of square tubing sections 126 is positioned at and around the end caps 52, angle brackets 128 spanning the corners of the rectangle 124 for strength and for securing with the face plates 56 (FIG. 4). The rectangle 124 includes the pair of vertical posts 24 having sufficient strength to support multiple tank containers 10 being stacked thereupon, as is generally known for stacking intermodal containers. As can be seen by comparing FIGS. 15 and 16, the rear frame 20a has a notch formed 132 in a lower crossbar 134 that provides clearance for the discharge valve 100 and steam inlet 108 and steam outlet 110, noted above and best seen in FIG. 12, while a lower crossbar 136 of the front frame 136 does not. Each of the frames 20 includes a plate 140 having rearwardly extending elbow plates 142. When the frame 20 is secured with the vessel 30 of FIG. 5, the plate 140 abuts the face plate 56 and the elbow plates 142 are welded or otherwise secured to the exterior of the barrel 50, as illustrated in FIGS. 17 and 18. The legs 120 are connected by a brace 150 with the lower crossbars 134, 136. A document holder 152 is mounted on the rear lower crossbar 134.

The front and rear supports 94, 96 assist in aligning the cladding 32. That is, each support 94, 96 extends through the cladding 32 and, thus, a shoulder 159 is provided on each support 94, 96 that assists in and confirms proper alignment of the cladding 32, the supports 94, 96, and the barrel 50. The front and rear supports 94, 96 also have studs 160 thereon for mating with the chassis 12, as will be discussed in greater detail below. It should be noted that the illustrated front and rear supports 94, 96 are not identical. Each is designed in the present form for the particular forces and use at the point on the vessel 30 with which the supports 94, 96 are installed. However, it is also recognized that one may be smaller, depending on weight necessity, resulting in a materials savings, or one may elect to provide identical supports 94, 96 in order to reduce the number of unique components required for assembly. Each of the supports 94, 96 is arcuate along top edges 166 for mating with and following the curve of the exterior of the barrel 50.

FIG. 23 illustrates the ladder 36. The ladder 36 is positioned along a side of the tank container 10, as opposed to a rear end as is generally known for prior art intermodal tank containers. The prior art arrangements are partly the result of the tank frame having upper and lower horizontal frame members extending along the longitudinal direction so that the frame defines a rectangular box, the horizontal frame members forming the corners of the box; a ladder on a side would thus have to find a way to allow a person to climb over or under these horizontal frame members. Additionally, the prior art requires a worker to climb onto the chassis G at the rear end and walk across the chassis G to attach a discharge hose to the rear end of the prior art tank T, which is dangerous in inclement or icy weather or when the chassis G has other material (such as oil) on its surface. If the worker is to climb the ladder in order to climb atop the tank container T, that worker must walk approximately ½ the length of the tank container T (10') in order to reach a manway or hatch (not shown).

The general construction of the ladder 36 is to allow the ladder 36 to curve along the profile of the tank container 10 and, preferably, along the curve of the barrel 50. The ladder 36 includes side plates 170 with rungs or step plates 172 extending therebetween. The position of the ladder 36 allows quicker, safer, and easier access for personnel to the walkway 38 on the top of the tank container 10, as well as to the manway 40 and cleaning ports 64, etc. As the frames 20a, 20b secure directly with the vessel 30, without frame members running the length of the tank container 10 as is known for the prior art, the ladder 36 is free to be positioned on the side, and materials for the frame 20a, 20b are reduced in comparison to the prior art. A retractable ladder 36a is provided on the chassis 12 and, specifically in the present form, has a hinged connection 300 connected to first and section ladder beams 302 extending between chassis beams 202 (see FIGS. 2 and 27). This arrangement for the ladders 36, 36a, is much safer as a worker need not traverse a deck of the chassis 12, and always has a handhold available when attempting to reach the manway 40.

The cladding 32 is illustrated in FIG. 24 along with cladding supports 34 and spacers 180. Vacuum rings 58a are provided, as is known in the art, to assist in preventing tank collapse during discharge. The cladding supports 34 secure over and around the vacuum rings 58a (see FIG. 3). The spacers 180 are placed on the outside of the cladding supports 34 so that the spacers 180 actually span between and connect the cladding 32 with the cladding supports 34. The spacers 180, best seen in FIGS. 25 and 26, are strips of a relatively rigid plastic material that has a series of "egg cup" recesses or offset portions 180a. The spacers 180 are curved during installation with the cladding supports 34 to have the same curved profile while retaining the offset portions 180a in such an arrangement. In the event the cladding 32 is struck, the spacers 180 absorb the shock. However, the offset arrangement and selection of resiliently deformable materials for these spacers 180 allow for some bounce back to their original shape. Thus, the resilience of the spacers 180 results in less damages to the cladding 32 and less maintenance thereof. The spacers 180 are also used in generally straight strips 180b along the top and bottom of the barrel 50, as is illustrated in FIG. 24. It should also be noted that the polymeric material of the spacers is less of a heat sink than traditional aluminum spacers which have a very high thermal conductivity.

Figure 27:
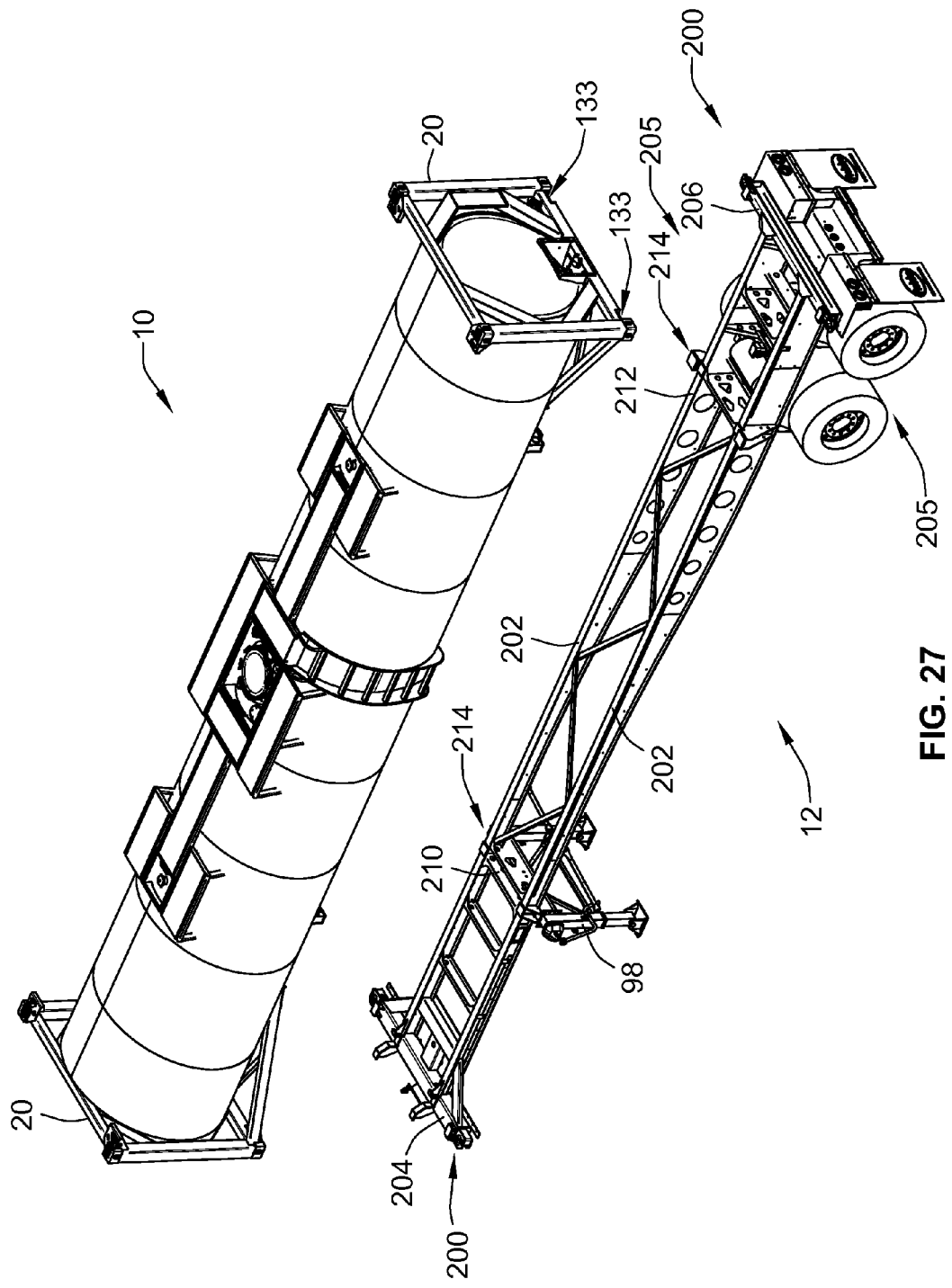
FIG. 27 is a perspective view of the tank container and chassis in a general relative orientation in which the tank container may be lowered onto the chassis for transport thereby.
Figure 28:
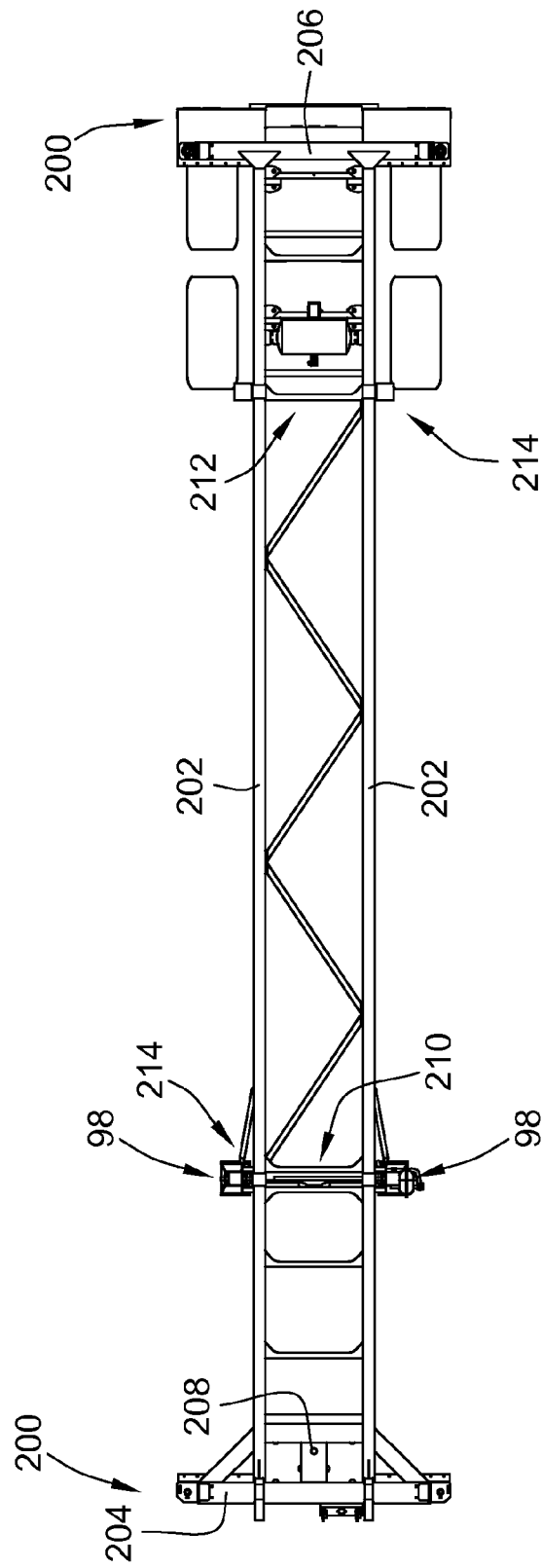
FIG. 28 is a top plan view of the chassis of FIG. 27 showing a pair of parallel beams for supporting the tank container and displaying certain lateral forces acting upon the chassis, the tank container, and a ground surface when in use.

The tank container 10 is generally raised or lowered vertically with respect to the chassis 12 as represented by FIG. 27. The longitudinal direction of the tank container 10 is aligned with a longitudinal direction of the chassis 12 so that the ends 22 of the tank container 10 positioned with ends 200 of the chassis 12 (also referred to herein as "first and second chassis ends"), as will be discussed in detail below.

The chassis 12 includes a pair of parallel beams 202 generally in the shape of an I-beam. The beams 202 terminate at front and rear crossbeams 204, 206, respectively. The frames 20 of the tank container 10 are aligned with and rest upon the crossbeams 204, 206 such that the weight of the tank container is supported by the crossbeams 204, 206. The front crossbeam 204 is positioned a short distance forward of a hitch pin 208 of the hitch connection 14, which allows for a relatively small moment arm for the weight relative to the hitch connection 14. The chassis 12 further includes a front, intermediate crossbeam 210 and a rear, intermediate crossbeam 212, and an engagement interface 214 for passive mating with the tank container 10 is provided at each.

Figure 29:
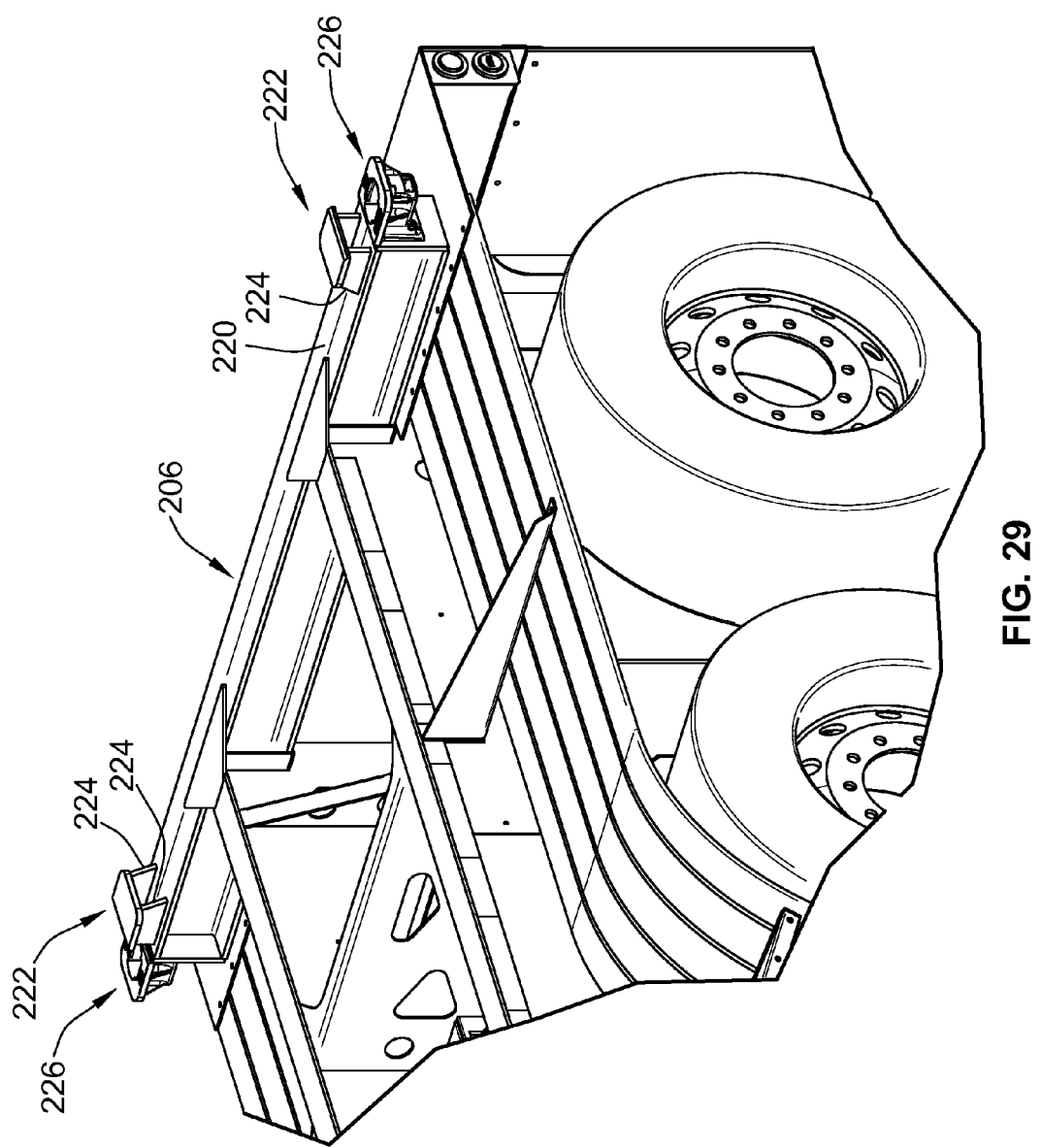
FIG. 29 is a perspective detail view of a rear support portion of the chassis showing rear posts receivable by the tank container.

The rear crossbeam 206 is shown in FIG. 29 has having a generally horizontal support surface 220 spanning laterally between upstanding guide/lock posts 222. When the tank container 10 is lowered onto the chassis 12, ramps 224 on the guide/lock posts 222 serve to properly align the rear frame 20a of the tank container 10 onto the chassis 12 and onto the rear crossbeam 206. The guide/lock posts 222 are sized so that there is a relatively close fit within notches 133 (FIG. 14) in the lower crossbar 134 of the rear frame 20a, thus providing a relatively specific position for the tank container 10 on the chassis 12. Laterally outboard from the guide/lock posts 222 are lock plates 226 for receiving twistlocks (not shown) as are conventionally known in the field of the art.

Figure 30:
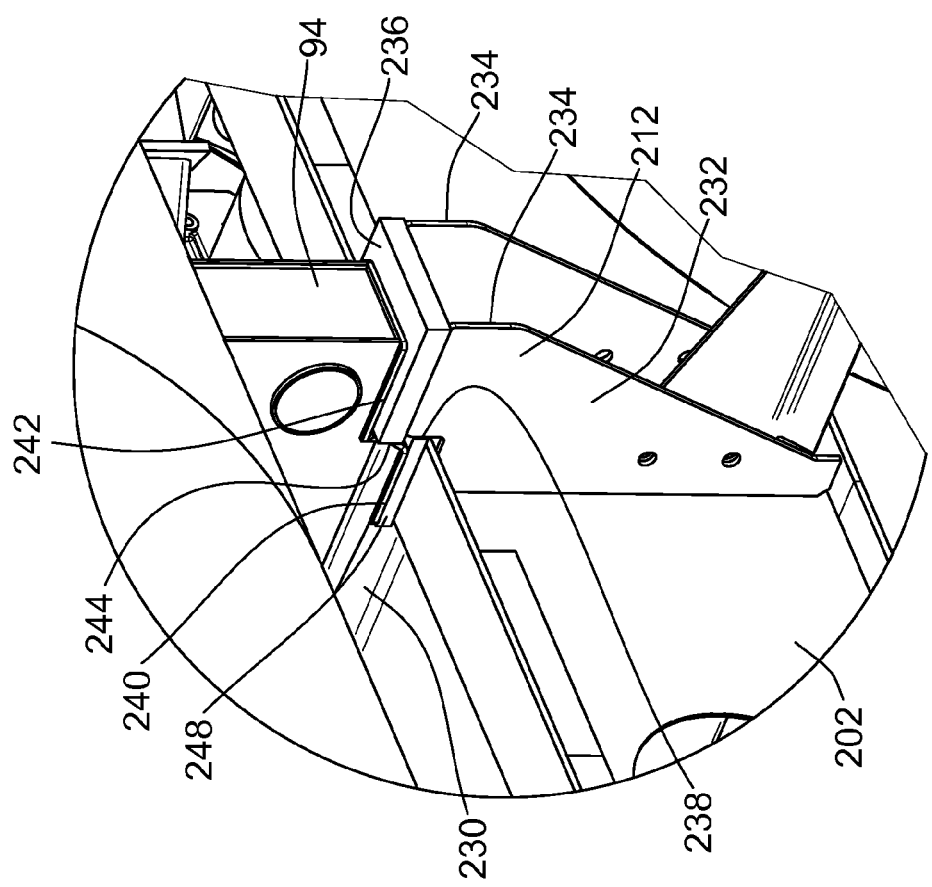
FIG. 30 is a perspective detail of the chassis with the tank container secured therewith, the chassis having a rear, intermediate interface connection engaged with the rear support of the tank container.
Figure 31:
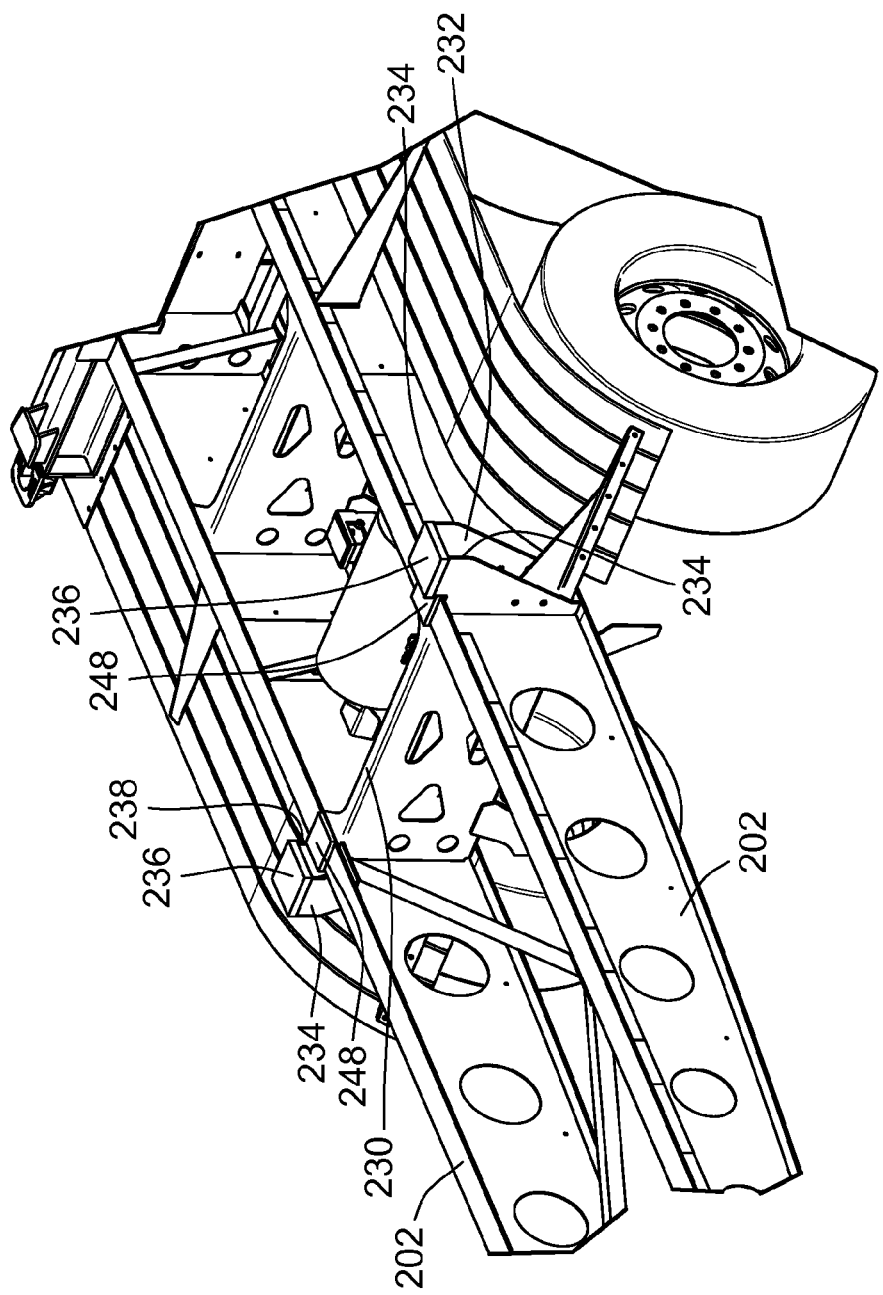
FIG. 31 is a perspective detail view corresponding to FIG. 30 showing the intermediate interface connection without the rear support engaged therewith.

The engagement between the engagement interface 214 of the rear, intermediate crossbeam 212 and the rear support 94 is shown in FIGS. 30 and 31. The engagement interface 214 includes a flat 230 spanning laterally across the crossbeam 212 and includes a pair of U-shaped plates 232 secured laterally outwardly from the beams 202, with the flat 230 therebetween. The U-shaped plates 232 have first and second leg portions 234 secured with its respective beam 202, each extending above the beam 202 and joined by a crossplate 236. A notch 238 is formed in each of the leg portions 234 proximate the top of the beam 202 and the flat 230, with the leg portion 234 positioned outwardly from the notch 238 and extending with the notch to the crossplate 236. The rear support 94 includes a pair of horizontal flats 240, 242, the first flat 240 being formed on the stud 160 (FIG. 21) and the second flat 242 being formed above the first flat 240 so that a shoulder 244 is formed therebetween. When the tank container 10 is lowered onto the chassis 12, the rear support first flat 240 rests on the flat 230 of the crossbeam 212, the rear support second flat 242 rests on the crossplate 236, and the rear support shoulder 244 abuts the notch 238 in the leg portions 234. In the presently illustrated form, a riser 248 is disposed between the crossbeam flat 230 and the rear support first flat 240. It should be noted that the shoulder 244 and the notch 238 are relatively closely mated, preferably squared to each other.

Figure 32:
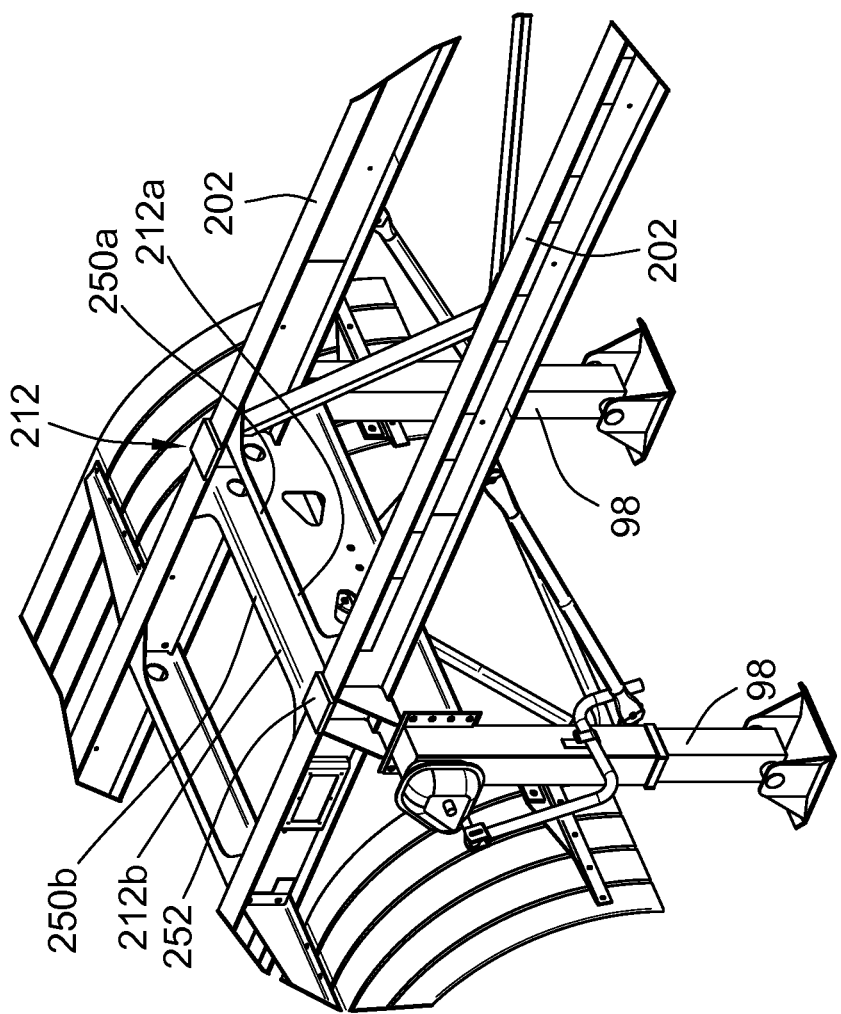
FIG. 32 is a perspective detail of the chassis having a front, intermediate interface connection.
Figure 33:
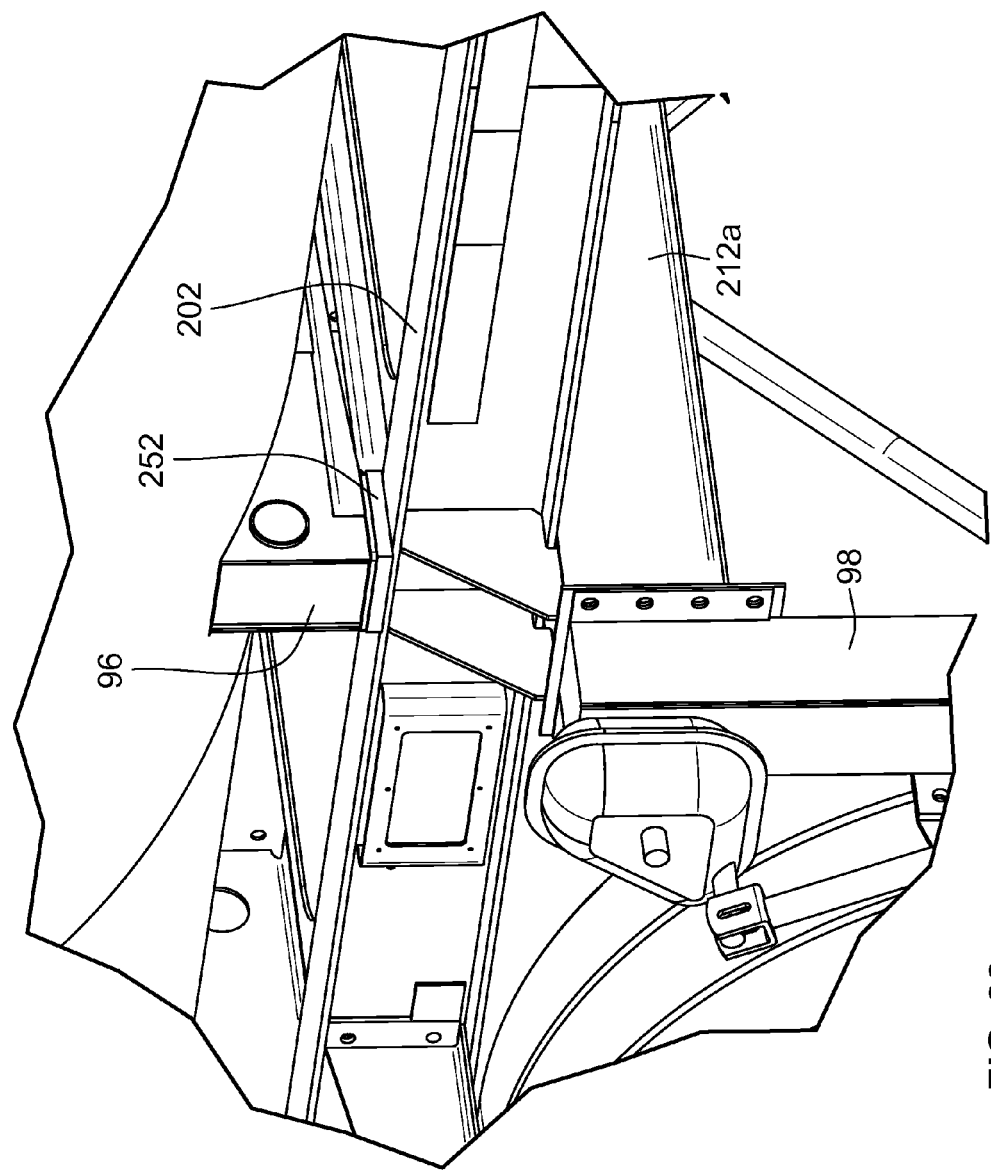
FIG. 33 is a perspective detail view corresponding to FIG. 32 showing the tank container front support engaged with the front, intermediate interface connection.

An arrangement similar to, though simplified from, that of the rear, intermediate crossbeam 212 and the rear support 94 is provided for the front, intermediate crossbeam 212 and the front support 96 (see FIGS. 32 and 33, and also FIG. 22). The front, intermediate crossbeam 212 includes a flat 250 extending laterally and, in fact, includes a pair of flats 250a, 250b formed on respective crossbeam members 212a, 212b. Between the junctions between the crossbeam members 212a, 212b and the beams 202 are risers 252 upon which the studs 160 of the front support 96 (FIG. 22) rest when the tank container 10 is positioned on the chassis 12. In contrast to the rear, intermediate crossbeam 212, there is no notch/shoulder engagement between the front support 96 and the chassis 12. The crossbeam members 212a, 212b extend outwardly below the beams 202 and form securement points for the landing gear 98. As such, the weight of the tank container 10 may be more directly transferred through and supported by the landing gear 98 when the chassis 12 and tank container 10 thereon are disconnected from the hitch connection 14 and the tractor 16.

Figure 34:
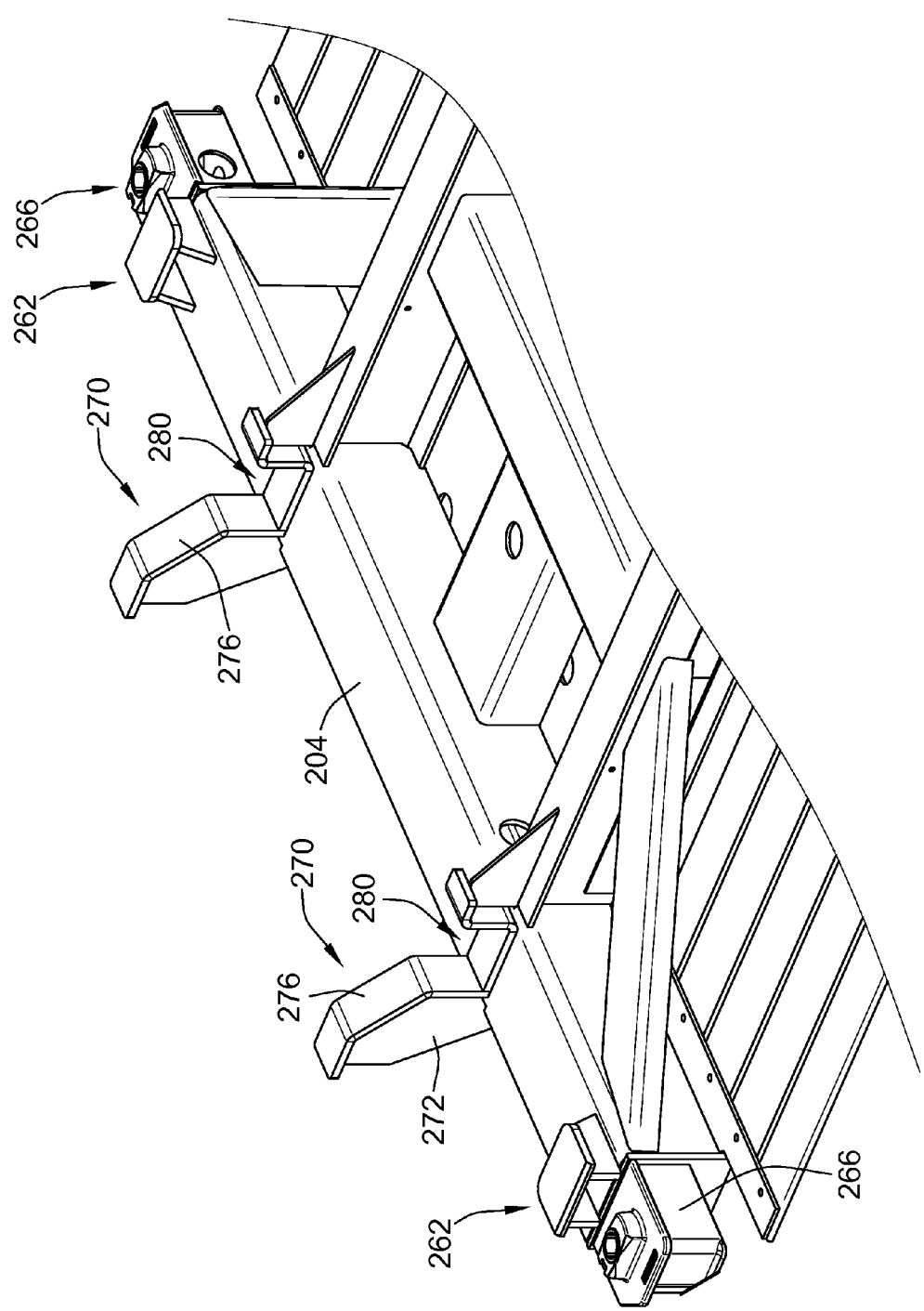
FIG. 34 is a perspective detail view of a front support portion of the chassis showing front posts receivable by the tank container.
Figure 35:
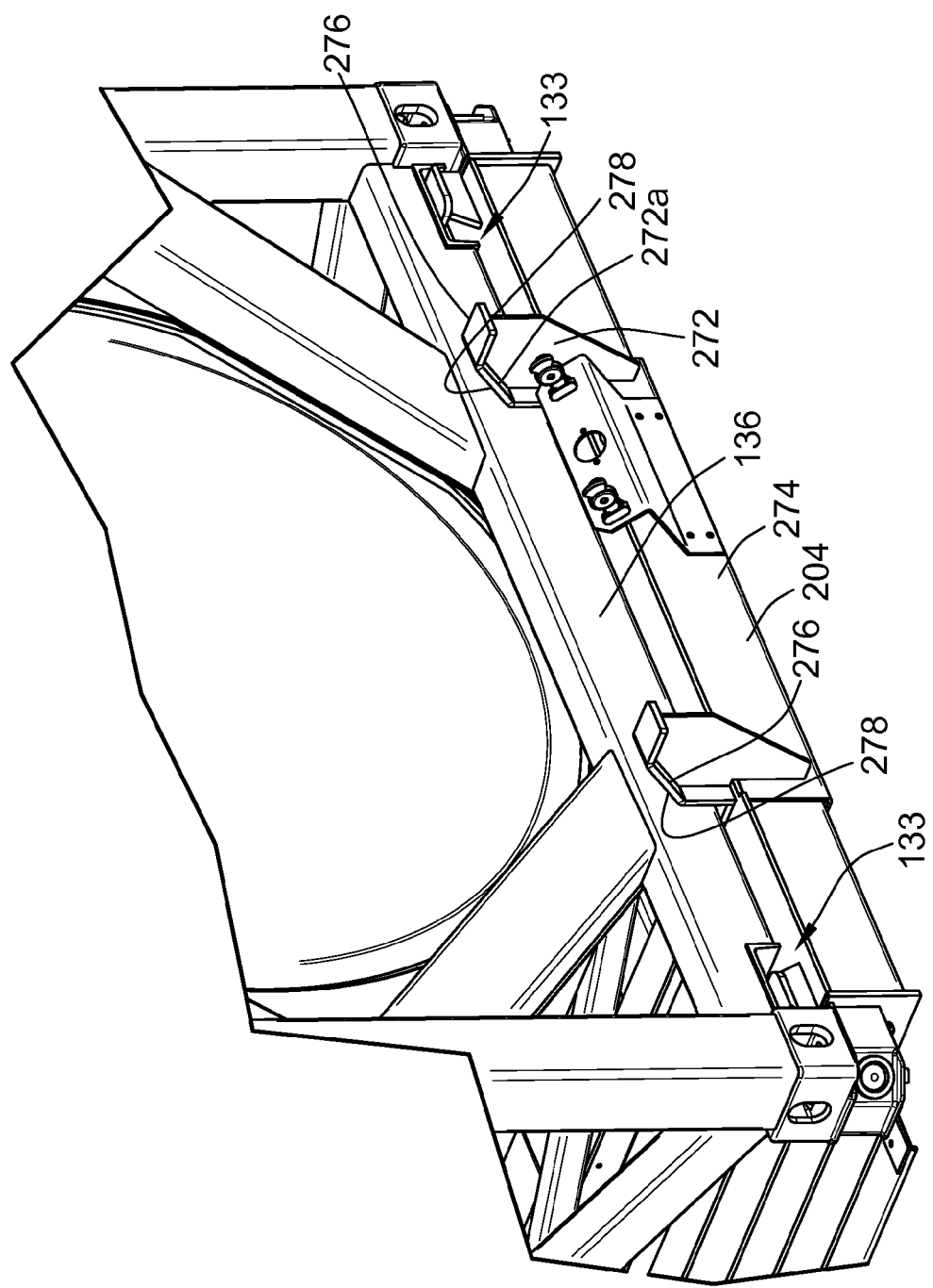
FIG. 35 is a perspective detail view of the front support portion of the chassis showing the tank container engaged with the front posts of FIG. 34.

Turning now to FIGS. 34 and 35, the front crossbeam 204 cooperates with the front frame 20b of the tank container 10 in a manner similar to that described above for the rear crossbeam 206 and the rear frame 20a. The front crossbeam 204 includes a flat 260 extending across the crossbeam 204 and has guide/lock posts 262 similar if not identical to the guide/lock posts 222 of the rear crossbeam 206 positioned proximate outboard ends of the crossbeam 204. The guide/lock posts 262 are received within notches 133 (FIG. 16) of the lower crossbar 136 the vertical posts 24 of the front frame 20b when the tank container 10 is lowered onto the chassis 12. Lock plates 266 are provided on the ends of the crossbeam 204 for use with twistlocks (not shown) or the like for manually securing the frame 20b with the chassis 12. In addition, a pair of positioning guides 270 are disposed on the front crossbeam 204. The positioning guides 270 include a front elbow plate 272 secured such as by welding in an I-beam fashion with a front surface 274 of the crossbeam 204, which is generally a square tubing section. The elbow plate 272 rises above the crossbeam 204 and has a portion 272a angled forwardly away from the crossbeam 204, and a guide plate 276 is secured to the angled portion 272a to form a chamfer or ramp 278 against which the lower crossbar 136 of the front frame 20b may ride so as to guide the front frame 20b and the tank container 10 into proper position with the chassis 12, the front frame 20b and lower crossbar 136 being received in a receptacle 280 defined by each of the positioning guides 270. Square tubing angle braces 282 extend from the crossbeam 204 to the beams 202 providing additional rigidity.

It should be noted that the notches 133 of the frames 20a, 20b may have a different shape from the illustrated somewhat rectangular shape, such as by being shaped as a triangle. However, it is believed that the notches 133 as depicted will result in less damage from use.

It should be noted that the engagement interfaces 214 between the intermediate crossbeams 204, 206 are passive. In a typical railyard or truck depot or other place where containers are set or lifted from chassis, workers are not used to seeing locks at places other than the corners. Therefore, it is considered a feature that workers do not need to be trained in any special manner for using the tank containers 10 and chassis 12 of the present invention, and that no significant additional effort or labor is required.

As discussed briefly above, the chassis 12 has a reduced overall weight and construction in comparison to a standard prior art intermodal tank chassis, such as the gooseneck, drop-deck chassis G of FIG. 1. This reduction is made possible by features of both the chassis 12 and the tank container 10. Because the tank container 10 is longer, the weight thereof is distributed over a greater span; more importantly, though, is the fact that the support points (principally the front and rear crossbeams 204, 206) of the chassis 12 are over the rear wheels 205 (FIGS. 2 and 27) and over the hitch connection (FIG. 2) so that bending moments are reduced. This means that the beams 202 need not be as strong. The bend U of the gooseneck, drop-deck chassis G is also eliminated. Perhaps the most salient features for reduction of chassis 12 construction, however, are the manner in which horizontal, or lateral, bending torques are addressed and the elimination of the need for the spread axle rear tandem suspension, noted above.

In all tank container applications, the liquid shifts during movement. When a vehicle is making a turn on a road, the liquid will tend to move toward the opposite direction as the turn. This produces a large force through the center of the tank, causing a prior art tank to bend outwardly and making the prior art tank susceptible to damage and to rolling, as well as putting tremendous stress on the chassis. It is this stress that is also one of the principal reasons for the design of prior art intermodal tank chassis.

In the present chassis 12 and tank container 10 arrangement, the tank container 10 and the chassis 12 cooperate to absorb this stress. That is, the front and rear crossbeams 204, 206 lock with the front and rear frames 20a, 20b respectively, and the tank container rear support 94 locks between (but not with) the rear, intermediate crossbeam 212. More appropriately, the rear support 94 abuts the notches 238 at the rear, intermediate crossbeam 212. In this manner, the lateral stresses on the tank container 10 are largely absorbed by the design of the tank container 10 itself, principally the barrel 50. Because of the positioning of the connections between the tank container 10 and chassis 12, no significant moment arms or torques are generated by the these stresses in the tank container 10 when they are transmitted to the chassis 10.

Figure 36:
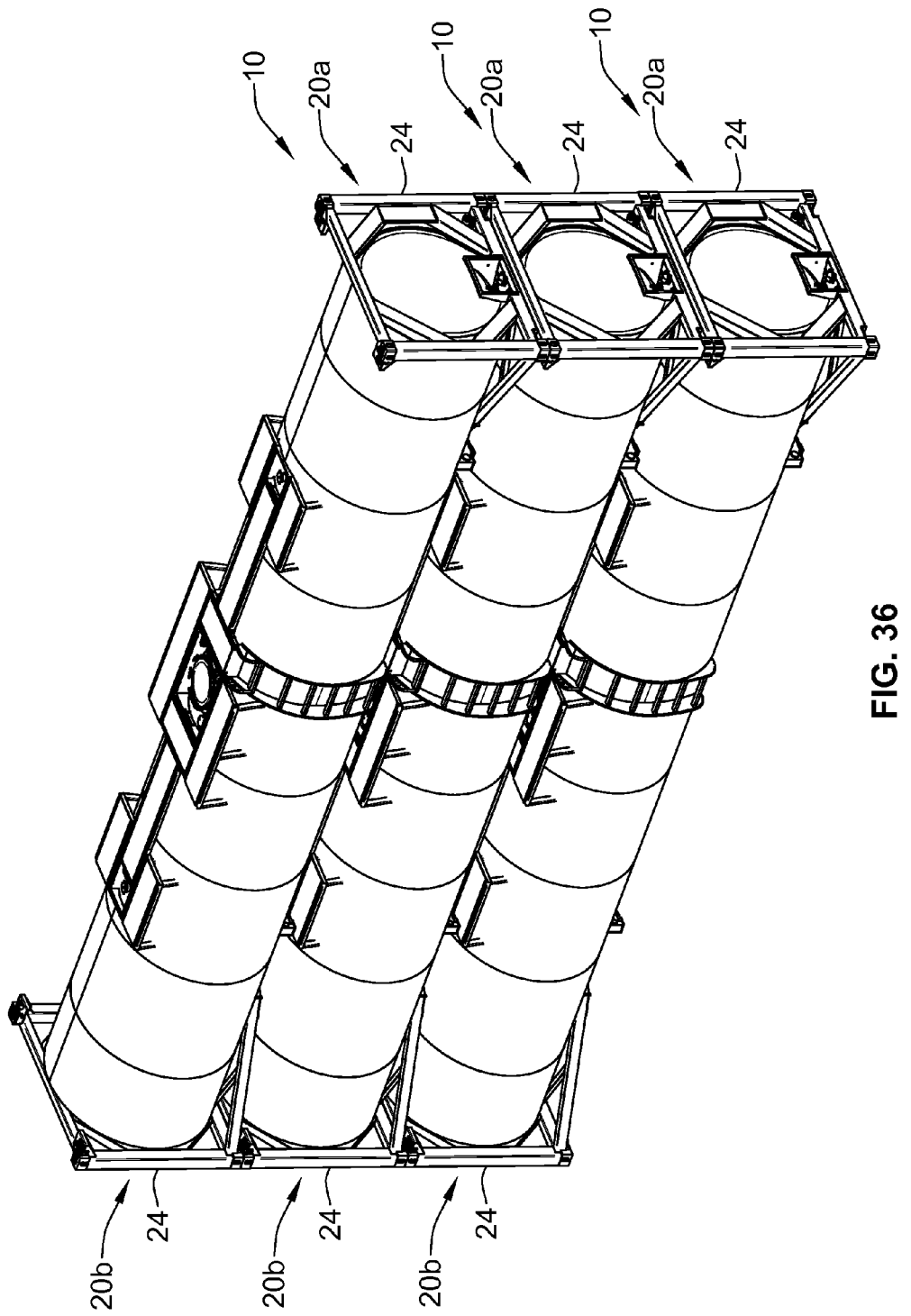
FIG. 36 is a representative perspective view of three tank containers of a form of the present invention in a stacked relationship.
Figure 37:
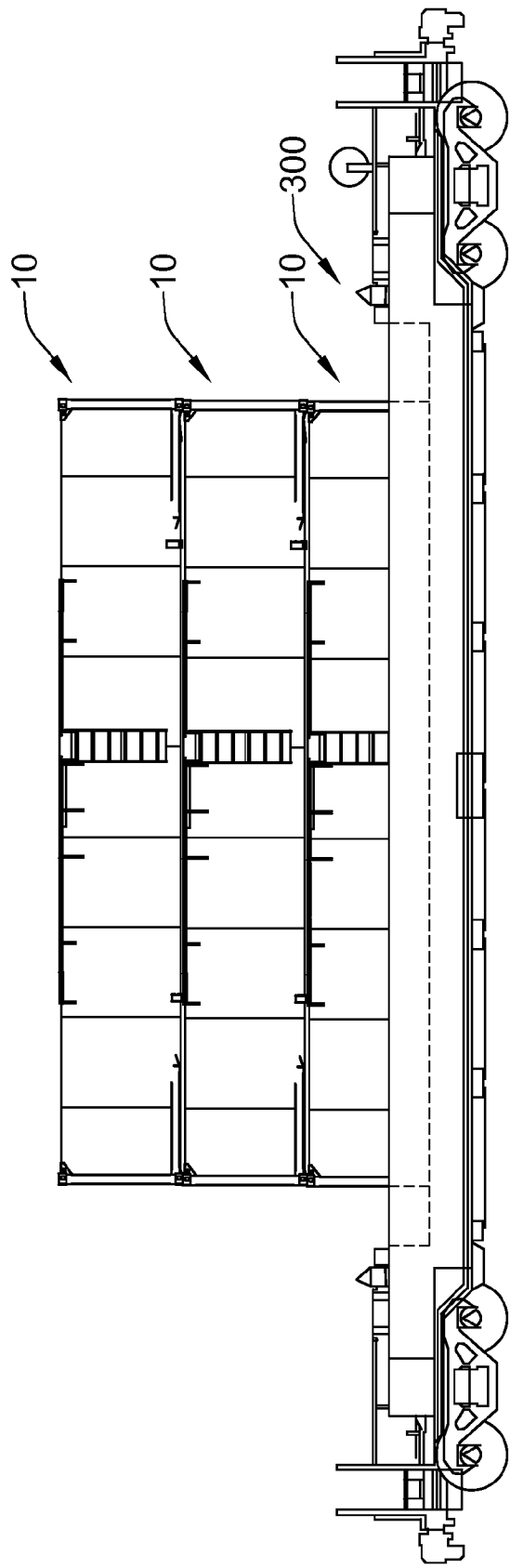
FIG. 37 is a representative side elevation view of three tank containers of a form of the present invention in a stacked relationship in a well of a well rail car.

Turning now to FIGS. 36 and 37, a stack arrangement for the tank containers can be seen. For standard dry goods containers, a typical or common height is 8'6" or 9'6" so that two dry goods containers are stacked to 19'. However, ISO standards permit up to 19', and some containers approved for stacking are 9'6", two of such containers equaling the 19' ISO limit. The tank container 10 is preferably 6'4" in height, at the frames 20a, 20b, which allows the tank container 10 to be stacked three high within the 19' ISO limit, each tank container 10 still carrying a greater load (27,000 liters) than a standard intermodal tank container (26,000 liters). It should be noted that forms of the present invention contemplate identical or substantially identical frames 20a, 20b being employed a vessel 30 that is reduced in diameter from that described above so that lower capacities may be used: as loads are generally expected to be 80% of capacity in order to set a maximum allowable sloshing of the payload materials, it may be desirable to reduce the vessel diameter so that a payload of approximately 20,000 liters is provided with the same overall dimensions for the tank container 10 as generally described herein. It should also be noted that weight for rail cars is not nearly as significant an issue as it is for OTR tractors 16. In such a stacking arrangement, the respective frames 20a, 20b of adjacent tank containers 10 are locked at the vertical posts 24, such as by twistlocks. FIG. 36 shows a storage stacking, while FIG. 37 shows a stacking capability within a rail well car 300. For static storage, 3 high is suitable; if empty, the tank containers 10 may be stacked as high as 9. For all stacking applications, the tank containers 10 are known to be suitable for at least 2 high. In any event, the present tank container 10 of 6'4" combined with the chassis 12 and a tractor 16 generally places the top of the tank container 10 at approximately 10'4", from ground to top. The prior art intermodal tank containers T and chassis G are generally 8'6" from the chassis deck, for a total of 12'2". Due to this height, prior art intermodal tank containers T are unable to access many of the older loading racks (top loading) designed for OTR tank trailers (approximately the same height as the tank 10 and chassis 12 of the present invention).

The prior art intermodal tank chassis such as the gooseneck, drop-deck chassis G positions the tank in an angled or tilted forward position during travel. For discharge, the front end is raised with a separate pneumatic system, tilting the tank so that the liquid can be discharged at a rear end of the tank. As can be seen in FIG. 1, there is a significant distance from the rear end of the tank and the rear end of the chassis G, which generally is in the order of 13-15 feet.

Noted above, the need for a spread axle rear tandem suspension is eliminated. For the arrangement of forms of the present invention, the chassis 12 is provided with an air ride system as is known for trailers and chassis generally. During operation, the rear end 12a of the chassis 12 is approximately 54" from the ground level, and has a short deck 102 thereat, as a typical non-intermodal tank trailer would have. In the form illustrated, the chassis 12 is 41'6", with the rear short deck 102 being approximately 1'2", which is comparable to what a driver would expect for a non-intermodal OTR tank trailer. When discharge is desired, the air ride system is used to lower the rear end 12a to approximately 50", making discharge much faster and reducing the difficult of discharging the heel of the tank completely. The arrangement is also that which is familiar and comfortable to the shipping and trucking community, outside of the intermodal tank arena, and eliminates the need for 13-15 feet of hosing to be strung up the chassis G of the prior art arrangement, allowing workers to operate while remaining on the ground, again this arrangement being more comfortable and known to the workers and, thus, being more accepted by the community.

A benefit of the tank container 10 and chassis 12 arrangement is the use within the trucking and shipping community, certain points discussed above. There is resistance by truckers at driving more difficult loads, and a premium is exacted for moving intermodal tank containers and for driving heavier trucks. The tank container 10 and chassis 12 present no more difficult a load than a standard tank trailer (i.e., non-intermodal) or other trailer to a trucker. In fact, the appearance to a trucker, shipper, and consignee will be relatively transparent, both to the eye and in practice with the increased safety as the tank meets the higher ISO standards for intermodal tank containers. The reduced height of the tank container 10 to 6'4" places the center of gravity at a level comparable to that of a non-intermodal tank trailer so that the rolling risk is the same, and the combination of the tank container 10 and chassis 12 are generally a comparable height as the non-intermodal tank trailer, as discussed above. The combination of the tank container 10 and chassis 12 are also suitable for all US loading racks. These features are important for acceptance by the trucking and shipping community.

Because of the expense and difficulty and other deficiencies discussed herein for prior art intermodal tank containers, the use of such is not nearly as widespread as intermodal is for dry goods containers. Much of liquid transport is done by non-intermodal trailers being driven by truckers. While intermodal transport can use rail cars to deliver a container in 3 days from Los Angeles, Calif., to Chicago, Ill., a non-intermodal trailer can take 5-7 days. Moreover, drivers must be compensated for this time, and a premium is paid for drivers who are unable to return home every night, not to mention the fact that trains can run all night where drivers are limited in driving hours. In fact, the inability to be home each night is an issue that generally is always present in recruiting drivers. It is expected that a shipping company fleet would require approximately 1 tractor 16 for 3 every tank containers 10, and approximately 1 chassis 12 for every 2-3 tank containers 10, thus resulting in a huge capital expenditures savings in comparison to OTR tractors and tank trailers which require a much greater ratio of tractors to tank trailers, resulting in a much greater amount of capital committed to a fleet. Finally, intermodal shipment is vastly cheaper, with less fuel per ton of goods transported required for rail and, thus, less pollution and greater efficiency.

FIG. 38 illustrates an embodiment of the intermodal tank container and chassis according to the present application. The traditional configuration of the interface between a "non tunnel" container and a chassis is to engage and support the container at the four corner castings located as per ISO standards. These castings are located at the extreme ends of the container. However, because the suspension is located some distance ahead of the rear support points, the traditional chassis beam has to be built strong and stiff enough to resist the resulting bending moment.

The standard design also requires that the chassis be strong enough to make the undercarriage turn when corners are encountered. Sharp turns can result in large lateral forces that must be resisted by the chassis in the standard design.

The embodiment of FIG. 38 makes use of the inherent strength and rigidity of the tank container to resist the two forces described above rather than require the chassis to do so. The embodiment of FIG. 38 therefore allows the chassis to be much lighter, allowing increased payload without exceeding weight restrictions.

As shown, the chassis and tank combination 500 includes a chassis 505 and tank container 510. The chassis 505 includes landing gear 515 that allows the chassis 505 to rest when not in transport. The chassis 505 also includes two supports 520, 525 positioned inward from the extreme ends of the chassis 505. The first support 520 is built into the chassis above the landing gear 515 to allow the weight of the container 510 to rest on the chassis 505 frame when the chassis 505 is unhooked. The second support 525 is built into the chassis 505 just ahead of the front axle area, and can engage the bottom of the container 510. The second support 525 can be built so as to support approximately ½ of the weight to be carried by the chassis 505, and is better able to withstand the lateral forces generated by the chassis 505 during a sharp turn.

The chassis 505 can include a chassis ladder 530 and the container 510 can include a container ladder 535. The respective ladders 530, 535 can be positioned such that, when the container 510 is positioned on top of the chassis 505, the ladders 530, 535 are aligned with one another allowing a user to climb to the top of the container 510.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. An intermodal tank assembly comprising:
a tank having first and second ends; and
first and second frames supporting the tank at the first and second ends, respectively;
a plurality of first legs extending from the first frame and a plurality of second legs extending from the second frame;
a plurality of first brackets respectively coupled to the first legs and a plurality of second brackets respectively coupled to the second legs;
a first tank support coupled to the first brackets and a second tank support separated from the second brackets, each of the first and second tank supports adapted to engage with respective supports on a chassis,
wherein the first and second tank supports are disposed at a position longitudinally inward from the first and second ends.

2. The intermodal tank of claim 1, wherein the first and second frames each have a width of approximately 8 feet and a height less than the width.

3. The intermodal tank of claim 1, further comprising first and second container engagement surfaces that are adapted to cooperatively engage with first and second chassis engagement surfaces so as to achieve a passive interface between the chassis engagement surfaces and the container engagement surfaces.

4. The intermodal tank of claim 1, further comprising a manway positioned intermediate the first and second ends, and a plurality of cleaning ports located on opposite ends of the manway.

* * * * *